United States Patent
Yamamoto et al.

[11] Patent Number: 6,166,885
[45] Date of Patent: Dec. 26, 2000

[54] MAGNETIC RECORDING MEDIUM AND METHOD FOR PRODUCING THE SAME

[75] Inventors: Yuzo Yamamoto; Akira Noda, both of Tochigi-ken, Japan

[73] Assignee: Kao Corporation, Tokyo, Japan

[21] Appl. No.: 09/476,800

[22] Filed: Dec. 30, 1999

Related U.S. Application Data

[62] Division of application No. 08/704,134, Aug. 28, 1996, Pat. No. 6,043,961.

[30] Foreign Application Priority Data

Sep. 8, 1995 [JP] Japan ................................. 7-256977
Sep. 29, 1995 [JP] Japan ................................. 7-276334

[51] Int. Cl.$^7$ ............................. G11B 5/82; G11B 5/84; B24B 1/00; B24B 19/26
[52] U.S. Cl. .................. 360/135; 360/131; 428/694 SG; 451/63
[58] Field of Search ............................ 360/131, 135; 369/272, 280, 283, 286; 451/28, 41, 63, 111, 119, 158, 177, 259; 428/694 T, 694 TC, 694 TR, 694 TM, 694 BS, 694 BR, 694 BM, 694 SL, 694 SG

[56] References Cited

U.S. PATENT DOCUMENTS

| | | | |
|---|---|---|---|
| 5,062,021 | 10/1991 | Ranjan et al. | 360/135 |
| 5,070,425 | 12/1991 | Inumochi | 360/135 |
| 5,472,371 | 12/1995 | Yamakura et al. | 451/56 |
| 5,560,977 | 10/1996 | Yamamoto et al. | 360/135 |
| 5,573,447 | 11/1996 | Kozakai et al. | 451/41 |
| 5,576,918 | 11/1996 | Bar-Gadda et al. | 360/135 |
| 5,623,386 | 4/1997 | Sullivan | 360/135 |
| 5,643,649 | 7/1997 | Hagen et al. | 428/64.1 |
| 5,971,836 | 10/1999 | Kogure et al. | 451/41 |
| 5,984,765 | 11/1999 | Hashimoto | 451/165 |

FOREIGN PATENT DOCUMENTS 4-370519  12/1992  Japan.

OTHER PUBLICATIONS

Proceedings of the Japan Society for Precision Engineering, pp. 19–20, 1992, Y.Hara, et al., "Ductile–Mode Machining of Glassy Carbon".

*Primary Examiner*—David L. Ometz
*Attorney, Agent, or Firm*—Oblon, Spivak, McClelland, Maier & Neustadt, P.C.

[57] ABSTRACT

The method for producing a magnetic recording medium, includes the steps of (a) subjecting surfaces of a substrate to grinding by a ductile-mode grinding with a grinding wheel having a setting depth of cut of from 0.05 to 20 μm, to give a surface-worked substrate having grinding marks of arc patterns; and (b) forming recording medium-constituting layers at least comprising an under layer, a magnetic layer, and a protective layer on the surface-worked substrate, or on a mirror-polished substrate obtained by further subjecting the surface-worked substrate to a finish polishing. The resulting magnetic recording medium is constituted by (a) the surface-worked substrate or the mirror-polished substrate; and (b) recording medium-constituting layers at least comprising an under layer, a magnetic layer, and a protective layer, wherein the recording medium-constituting layers are formed on the surface-worked substrate, or on a mirror-polished substrate.

11 Claims, 8 Drawing Sheets

MAGNETIC RECORDING MEDIUM AND METHOD FOR PRODUCING THE SAME

CROSS-REFERENCE TO RELATED APPLICATION

This application is a divisional of application Ser. No. 08/704,134, filed on Aug. 28, 1996 now U.S. Pat. No. 6,043,961.

BACKGROUND OF THE INVENTION

1. Field of the Invention

The present invention relates to a magnetic recording medium and a method for producing such a magnetic recording medium.

2. Discussion of the Related Art

In recent years, precision working techniques, particularly ultra-smooth working techniques, for substrates made of brittle materials such as ceramics and carbon are in demand. For example, substrates, such as glass substrates, carbon substrates, and ceramic substrates, are used as substrates for magnetic recording media. In addition, silicon wafers are used in materials for semiconductors. Since the substrates for magnetic recording media and the silicone wafers mentioned above are required to have good ultra-smoothness, the smoothening of these substrates is generally achieved by polishing with loose abrasive grains. As the recording densities and memory capacities increase, a demand for the smoothness is escalating every year. Today, the arithmetic mean deviation of the profile Ra in the order of 10 Å or less, in some cases 5 Å or less, is in demand.

In the case where polishing of particularly brittle materials, such as glass substrates, carbon substrates, ceramic substrates, and silicon wafers, is conducted with loose abrasive grains, microcracks are liable to be generated during polishing owing to the brittleness of the substrates. Such microcracks are liable to induce read-write errors when the substrate is prepared into a magnetic recording medium or to corrode the substrates owing to foreign contaminants entering upon polishing or water formed upon capillary condensation while allowing to stand. Therefore, in view of suppressing the generation of the microcracks, conventionally, the polishing processes have been generally separated into multi-steps while sacrificing productivity. Since the polishing with loose abrasive grains has quite a highly artistic, skilled element, highly skilled techniques are required for achieving quality stabilization. Therefore, in order to obtain a mirror-polished substrate having a small Ra by the conventional methods of producing magnetic recording media, such factors as time, complicated procedures, and skilled techniques must be involved.

Further, aside from the above problems, the above methods have a problem in which a part of the abrasive grains remains in the substrate after polishing. The complete removal of the residual abrasive grains substrate is difficult even if the substrates were subjected to cleaning. When a sputtered, thin film is formed on a substrate still having residual abrasive grains, the breakages are generated in the formed film owing to the presence of the residual abrasive grains, thereby resulting in damages in the magnetic head. Also, in the cases where the above substrates are subjected to polishing with loose abrasive grains, uneven polishing ascribed to unevenness in the materials used is caused, i.e. shallow pits are formed because portions more easily polished are deeply scraped off.

In order to solve the problems mentioned above, various studies have been conducted to smoothen the substrate without loose abrasive grains. As one method, a method of smoothening the surface of the substrate by grinding the surface by a ductile-mode grinding with fixed abrasive grains has been proposed (see Hara et al., Proceeding of the Japan Society for Precision Engineering (1992), Autumn, pages 19 and 20). It is more preferable to conduct grinding of the brittle materials such as carbon substrates and ceramic substrates by ductile-mode grinding, because the following effects can be achieved.

(1) Since the extent of depths of cut of the individual abrasive grains in the substrate can be set to a level equal to or less than the ductile-brittle transition point of the substrate, the working mode of the substrate can be controlled based on ductile (plastic) deformation or ductile removal rather than brittle fracture, thereby making it possible to suppress the generation of microcracks;

(2) Since no loose abrasive grains are used, there are no danger of having residual abrasive grains on the substrate;

(3) The resulting substrate has excellent flatness, and having smaller amounts of rounding at edge portions normally observed in those obtainable by grinding with loose abrasive grains;

(4) The wear of the fixed abrasive grains is only slight, thereby substantially lowering the costs required for tools of consumption when compared with a case where disposable, loose abrasive grains are used;

(5) There are little artistic, skilled elements, thereby making process management and full-automation easy; and (6) The resulting surfaces after grinding are made even regardless of the unevenness of the materials used.

However, in the method of Hara et al., the grinding is carried out by an ultraprecision grinding machine manufactured by CUPE equipped with a cup-type wheel, the grinding marks are in multiple, crisscross patterns as shown in FIG. 1. In these grinding marks, the marks intersect with one another at numerous locations, and at these intersected points microcracks may undesirably take place. Also, density differences in the grinding marks appear in radial directions, thereby causing to have an unevenness in the distribution of residual internal stresses, or in the distribution of the work damaged layer on the surfaces of inner diameter side and the outer diameter side. Therefore, the physico-chemical properties of the surfaces are uneven, thereby causing differences in etching properties of the surfaces or in adhesion and corrosion resistance when forming thin films, which in turn causes warp in the resulting substrates.

Also, in the case where the grinding is carried out by a double-sided polishing machine with fixed abrasive grains, the grinding marks are in random crisscross patterns and the marks intersect with one another at numerous places, thereby undesirably generating microcracks. Further, in cases of subjecting the substrates to surface grinding by a machine with a cup-type wheel, the workpiece and the working surface of the grinding wheel are surface-contacted with each other. Therefore, the feeding direction of cut is set perpendicular to the contacted surface, so that grinding resistance in the direction of the depth of cut becomes excessive, thereby making it liable to cause damages on the workpieces and the grinding wheels, and also that deep scratch damages and microcracks on the workpiece are caused owing to the breaking down of the abrasive grains. Therefore, in order to obtain a mirror-polished substrate by the above method, it would be necessary to carry out polishing in the subsequent polishing process until the above scratching damages are completely removed. Thus, the finish polishing becomes time consuming, thereby resulting in providing limitations in improvements of productivity of the magnetic recording media.

SUMMARY OF THE INVENTION

In view of solving the above problems, an object of the present invention is to provide a magnetic recording medium substantially free from microcracks.

Another object of the present invention is to provide a method for producing such a magnetic recording medium at a high efficiency.

As a result of intensive research in view of the above objects, the present inventors have found that the generation of the microcracks can be suppressed by subjecting surfaces of a substrate by a surface-grinding machine so as to form grinding marks in arc patterns, wherein the grinding wheel used in grinding has a setting depth of cut of from 0.05 to 20 μm, and the individual abrasive grains in the grinding wheel having depths of cut of equal to or less than a ductile-brittle transition point of the substrate. They have also found that since the workpiece and the working surface of the grinding wheel are in linear contact with each other when the substrate is subjected to surface grinding using the outer peripheral surface of a straight-type wheel, the worked substrate and the grinding wheel are notably less likely to suffer damages. Further, the resulting surface-worked substrate obtained after grinding under the conditions has a thin, work damaged layer and small Ra, the finish polishing can be conducted in a short time, thereby resulting in improvements in the productivities of the magnetic recording media.

In one aspect, the present invention is concerned with a method for producing a magnetic recording medium, comprising the steps of:

(a) subjecting surfaces of a substrate to grinding by a ductile-mode grinding with a grinding wheel having a setting depth of cut of from 0.05 to 20 μm, to give a surface-worked substrate having grinding marks of arc patterns; and (b) forming recording medium-constituting layers at least comprising an under layer, a magnetic layer, and a protective layer on the surface-worked substrate, or on a mirror-polished substrate obtained by further subjecting the surface-worked substrate to a finish polishing.

In another aspect, the present invention is concerned with a magnetic recording medium comprising:

(a) a surface-worked substrate having grinding marks of arc patterns or a mirror-polished substrate obtained by subjecting the surface-worked substrate to a finish polishing; and (b) recording medium-constituting layers at least comprising an under layer, a magnetic layer, and a protective layer, wherein the recording medium-constituting layers are formed on the surface-worked substrate, or on a mirror-polished substrate.

BRIEF DESCRIPTION OF THE DRAWINGS

The present invention will become more fully understood from the detailed description given hereinbelow and the accompanying drawing which is given by way of illustration only, and thus, is not limitative of the present invention, and wherein.

Figure 1:
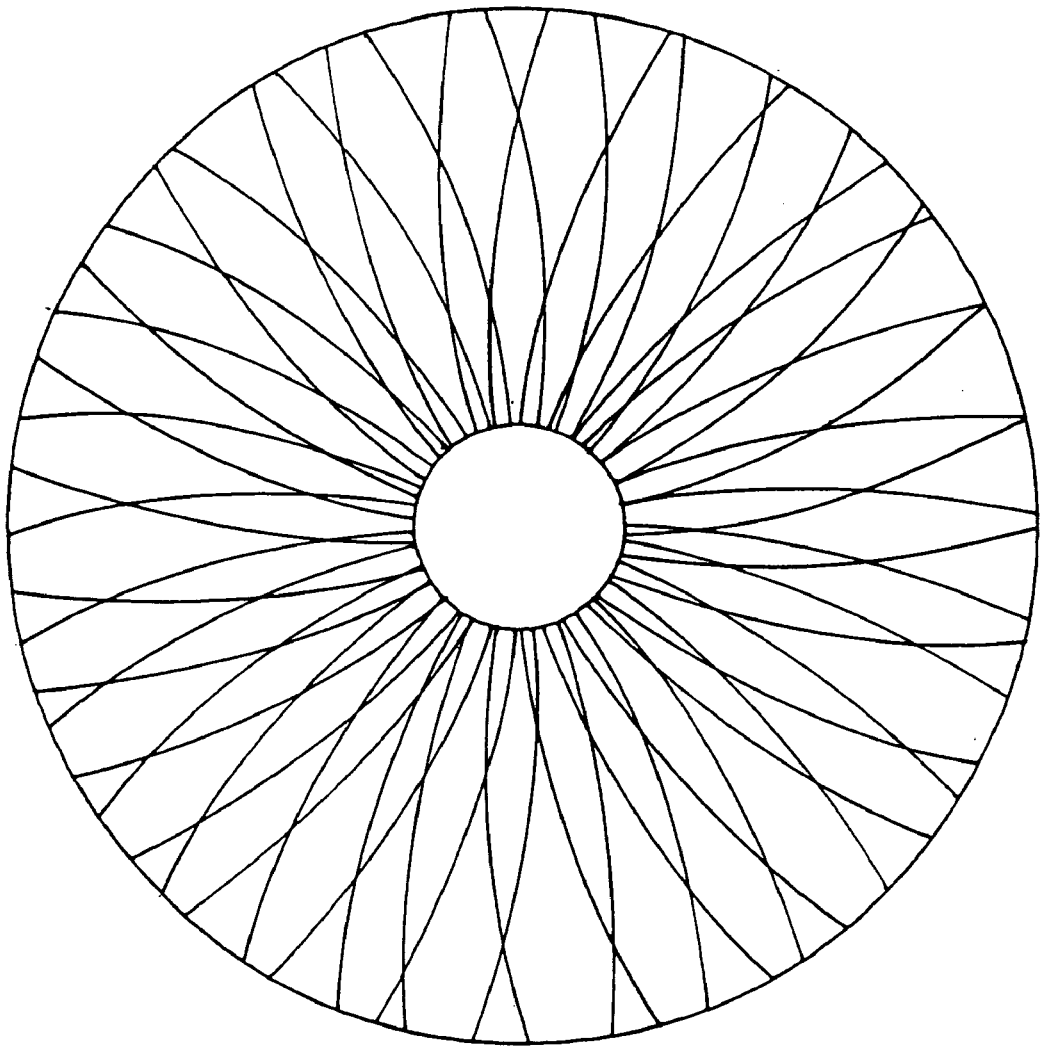
FIG. 1 is a schematic view showing grinding marks in the shape of multiple, crisscross patterns.

The reference numerals in FIGS. 1 to 8 denote the following:

1 is a work table, 2 a grinding wheel, 3 a conditioning wheel, 4 a chuck, 5 a slide base, 6 a spindle or hydraulic bearing, 7 a low expansion material, 8 a coolant supplying unit, 9 a work (workpiece), 11 a thickness-adjustable screw, 12 an insulator, 13 an electrode, 14 a grinding wheel, 21 a coating layer of abrasive grains, 31 a surface-worked substrate, 32 a Ti layer, 33 an Al—Si alloy layer, 34 a carbon layer, 35 a Cr layer, 36 a Co—Cr—Pt—B magnetic alloy layer, 37 a protective layer (glassy carbon layer), 38 a lubricant layer, NC is a numerical controller, PI is a proportional/integral controller, "a" a pressure-controlling servo valve, "b" a hydraulic source, "c" a hydraulic actuator, and "d" a laser scale (resolution: 10 nm).

DETAILED DESCRIPTION OF THE INVENTION

1. Method of the Present Invention

The method for producing a magnetic recording medium of the present invention comprises the steps of:

(a) subjecting surfaces of a substrate to grinding by a ductile-mode grinding with a grinding wheel having a setting depth of cut of from 0.05 to 20 μm, to give a surface-worked substrate having grinding marks of arc patterns; and (b) forming recording medium-constituting layers at least comprising an under layer, a magnetic layer, and a protective layer on the surface-worked substrate, or on a mirror-polished substrate obtained by further subjecting the surface-worked substrate to a finish polishing.

Therefore, the present invention has two embodiments:

1-1) An embodiment wherein recording medium-constituting layers are formed on a surface-worked substrate; and 1-2) An embodiment wherein recording medium-constituting layers are formed on a mirror-polished substrate.

1-1. The embodiment wherein recording medium-constituting layers are formed on a surface-worked substrate comprises the steps of:

(a) subjecting surfaces of a substrate to grinding by a ductile-mode grinding with a grinding wheel having a setting depth of cut of from 0.05 to 20 μm, to give a surface-worked substrate having grinding marks of arc patterns; and (b) forming recording medium-constituting layers at least comprising an under layer, a magnetic layer, and a protective layer on the surface-worked substrate obtained in step (a).

1-2. The embodiment wherein recording medium-constituting layers are formed on a mirror-polished substrate comprises the steps of:

(a) subjecting surfaces of a substrate to grinding by a ductile-mode grinding with a grinding wheel having a setting depth of cut of from 0.05 to 20 $\mu$m, to give a surface-worked substrate having grinding marks of arc patterns;

(b') subjecting the surface-worked substrate obtained in step (a) to a finish polishing, to give a mirror-polished substrate; and (c) forming recording medium-constituting layers at least comprising an under layer, a magnetic layer, and a protective layer on the mirror-polished substrate obtained in step (b').

1-1. Method of Embodiment (1)

Step (a)

The substrates to be subjected to grinding in step (a) may be ones which are obtained immediately after molding or baking, or they may be ones having an Ra (arithmetic mean deviation of the profile) of from 0.05 to 20 $\mu$m, preferably from 0.1 to 2.0 $\mu$m, namely those whose rough grinding or intermediary grinding is finished. In other words, in step (a), the substrates which are subjected to ductile-mode grinding include:

(1) The substrates obtained immediately after molding or baking;

(2) The substrates obtainable by subjecting surfaces of a substrate obtained immediately after molding or baking to rough-grinding by a conventional method; and (3) The substrates obtainable by subjecting surfaces to grinding up to intermediary grinding, i.e. rough grinding and intermediary grinding, by a conventional method.

Incidentally, methods of rough grinding or intermediary grinding of the substrates are not particularly limited, and any of known methods normally employed may be conducted, including polishing with loose abrasive grains and grinding with fixed abrasive grains. However, work damaged layers and scratches can be reduced by suitably selecting rough or intermediary grinding conditions.

Also, "Ra" in the present specification is a value obtained by measuring with a stylus-type profilometer by scanning in a direction perpendicular to the grinding marks in arc patterns or in multiple, crisscross patterns ("P2 Type," manufactured by Tencor) under the following conditions.

Measurement Conditions

Radius of stylus tip: 0.6 $\mu$m (curvature radius of stylus);
Applied pressure of stylus: 7 mg;
Measurement length: 250 $\mu$m at 8 locations;
Tracing speed: 2.5 $\mu$m/sec; and
Cut off: 1.25 $\mu$m.

The materials used for the substrates in the present invention are not particularly limited, and any of materials usually used for substrates may be employed. In the present invention, a preference is given to brittle materials because sufficient effects therefor can be obtained upon grinding. Examples of such materials include carbon, glass, ceramics, such as SiC, and silicon, among which a particular preference is given to carbon for having excellent grinding stability and low Ra. Therefore, the method of the present invention shows excellent effects when applied to carbon substrates.

Figure 2:
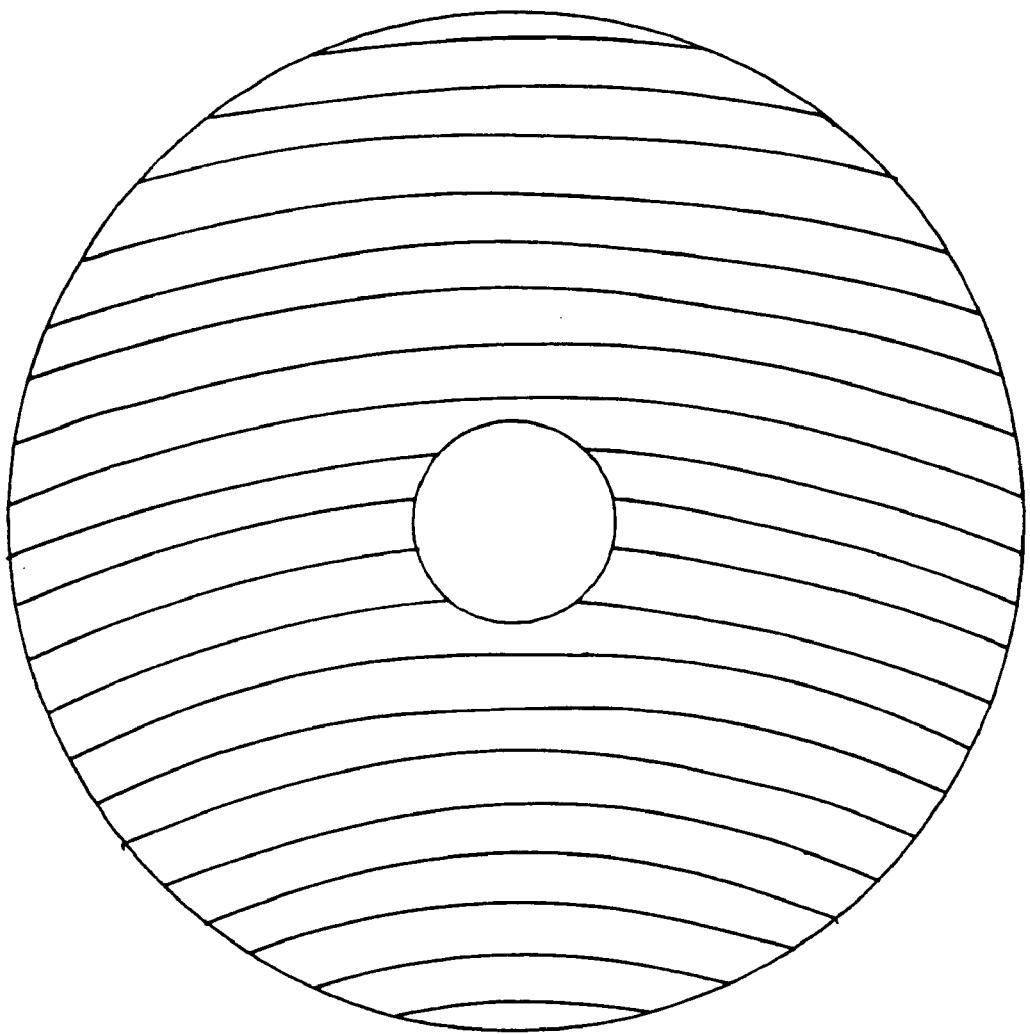
FIG. 2 is a schematic view showing grinding streaks of arc patterns.

The term "arc patterns" used for the description of grinding marks in the present invention refers to substantially concentric patterns schematically as shown in FIG. 2. Here, the center of the concentric circles may be on the substrate, or it may be outside the substrate. A preference is given to a case where the following relationship for $r_1$ and $r_2$ is satisfied;

$$r_2 \geq r_1,$$

wherein $r_1$ stands for a radius of the substrate, and $r_2$ stands for a radius of the grinding marks. More preferably, the following relationships are satisfied:

$$100\, r_1 \geq r_2 \geq 2\, r_1,$$

from the viewpoint of easiness of fixing of the workpiece (work) and working accuracy of the grinding machine.

In the present specification, the term "ductile-mode grinding" refers to a grinding process involving a removal process by plastic flow without generating microcracks even in the brittle materials; that is, the grinding is characterized by generating substantially no cracks in the materials without undergoing brittle fracture (crushing). This ductile-mode grinding can be achieved by always keeping the depth of cut of individual abrasive grains to the materials to a level of equal to or lower than the ductile-brittle transition point of the materials. The means for achieving the above level of depth of cut are not particularly limited, and many of usually known methods may be employed. For instance, any of materials generally used for substrates used in magnetic recording media and for silicon wafers have ductile-brittle transition points (dc) of from 2 to 100 nm; therefore, the setting depth of cut of the grinding wheel during the ductile-mode grinding is preferably from 0.05 to 20 $\mu$m, more preferably from 0.1 to 10 $\mu$m, particularly from 0.1 to 5 $\mu$m. Here, the setting depth of cut of the grinding wheel is preferably 0.05 $\mu$m or more from the viewpoint of the positioning accuracy of the grinding machine, and the setting depth of cut is preferably 20 $\mu$m or less from the viewpoint of reducing grinding loads and suppressing the generation of microcracks.

Further, it is highly desirable to round-off shoulders of the outer periphery of the grinding wheel (fixed abrasive grains), depending upon the setting depths of cut of the grinding wheel. By rounding off the shoulders, even when the setting depth of cut of the grinding wheel is large, worked surfaces substantially free from microcracks can be obtained by subjecting surfaces to ductile-mode grinding. The shapes of the round-off shoulders may be such that the depth of cut of the individual abrasive grains is smaller than the "dc" of the materials subjected to grinding. For instance, in the following equation:

$$d_g = 2aVw/Vs\sqrt{d_N/D}$$

wherein $d_N$ stands for a depth of cut per one rotation of the workpiece, which is expressed by the following formula:

$$d_N = f\sqrt{2\Delta/R}$$

f stands for an amount of cross feed of a grinding wheel per one rotation of the workpiece; $\Delta$ stands for a setting depth of cut of a grinding wheel; R stands for a curvature radius of a shoulder of an outer circumference of the grinding wheel; $d_g$ stands for a depth of cut of individual abrasive grains; "a" stands for a gap between individual abrasive grains; Vw stands for a peripheral speed of the workpiece; Vs stands for a peripheral speed of the grinding wheel; and D stands for a diameter of the grinding wheel, the following relationship is to be preferably satisfied:

$$d_g < dc.$$

Incidentally, in order to achieve ductile-mode grinding with the grinding wheel having a setting depth of cut of from 0.05 to 20 μm, the grinding machine and the abrasive grains should meet the following conditions:
1) Design and production of a spindle of a grinding wheel having extremely high dynamic rigidity. Dynamic errors in radial directions and axial directions are, respectively, 100 nm or less.
2) Design and production of workpiece support and a dynamic system thereof having extremely high dynamic rigidity. As a general rule, a loop rigidity between a tool and a workpiece may be 150 N/μm or higher (static rigidity).
3) The abrasive grain binders are provided with a suitable dressing for securing high-precision truing and appropriate degree of porosity of the grinding wheel. Further, the distribution of cutting edge height of the individual abrasive grains on the grinding wheel is desirably equal to or lower than the "dc".

Therefore, the grinding machines usable in step (a) are not particularly limited as long as the various conditions mentioned above are satisfied. Specifically, an example thereof include an ultraprecision surface-grinding machine "HPG-2A" manufactured by Kabushiki Kaisha Nisshin Kikai Seisakusho. This ultraprecision, surface-grinding machine "HPG-2A" is developed for the purpose of conducting ductile-mode grinding of brittle materials, which has the following properties:

1) Dynamic accuracy of radial and axial directions of 100 nm or less;
2) Loop rigidity between a tool and a workpiece of 170 N/μm (static rigidity).
3) Truing accuracy of 100 nm.

Therefore, this ultraprecision, surface-grinding machine "HPG-2A" satisfies all the requirements for the grinding machines mentioned above.

In addition, in order to form grinding marks of arc patterns, for instance, a workpiece (work) is fixed acentric on a workpiece-fixing plate (a work table) of a work spindle without including the rotation center of the work spindle, that is to satisfy the relationship of $r_2 \leq r_1$. Thereafter, the work table is rotated and the setting depth of cut of the grinding wheel is adjusted to a desired level, and then the work table is cross-fed in the direction of the spindle of the grinding wheel.

Even when the acentric degree is 0 (zero), namely when the work is fixed at the center of the work table, grinding marks can be produced without any intersections. However, in this case, since only one work can be fixed, the productivity becomes undesirably low. In the method of the present invention, a plurality of works can be fixed, thereby making it highly advantageous from the viewpoints of grinding efficiency and reduction of grinding costs.

Figure 3:
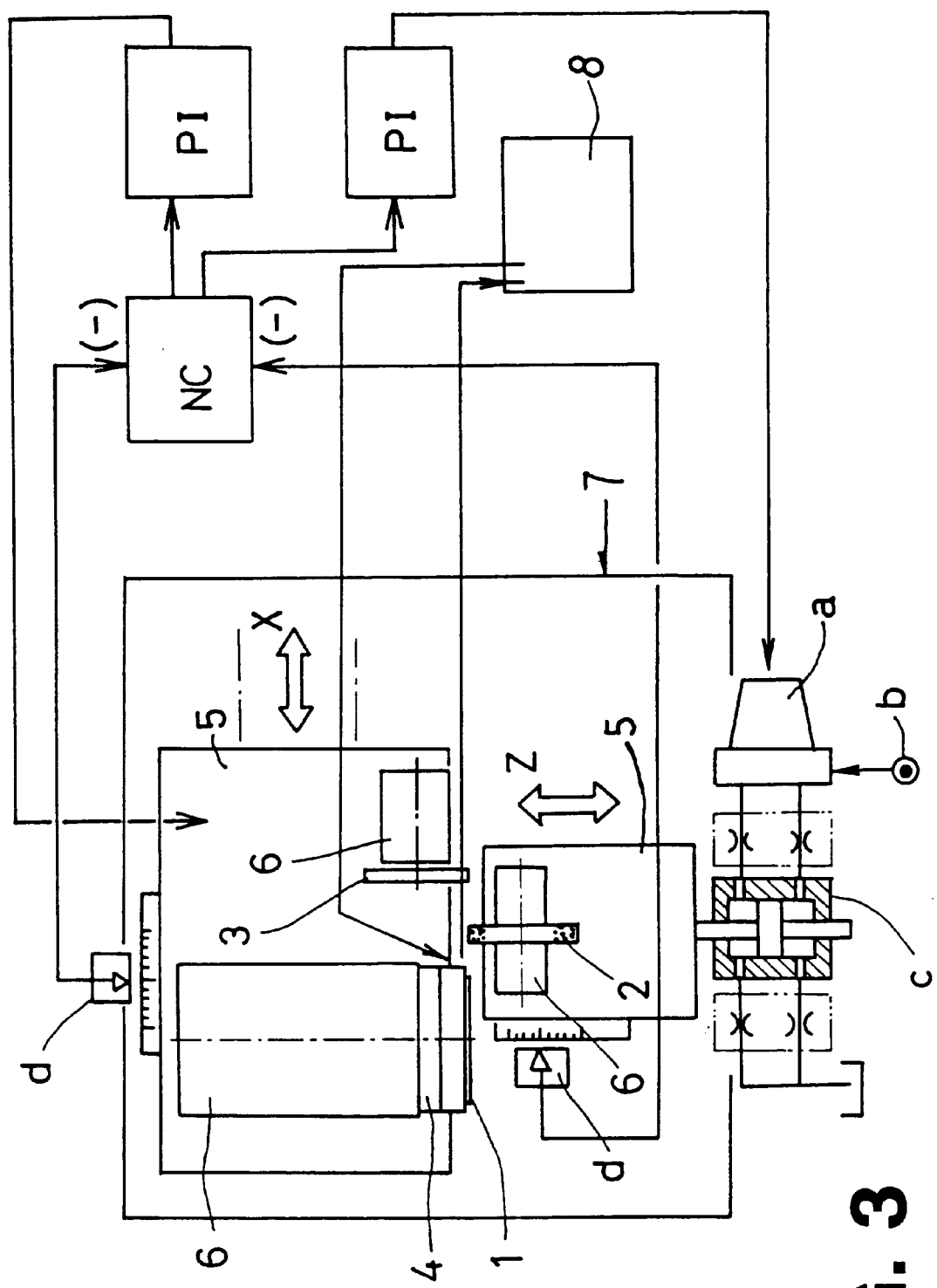
FIG. 3 is a schematic view showing an apparatus used in a grinding process in the present invention.

The grinding in step (a) will be explained referring to FIG. 3. Here, FIG. 3 is a schematic view showing an ultraprecision, surface-grinding machine "HPG-2A".

This grinding machine is a rotary surface-working machine for carrying out traverse grinding with an outer periphery of a straight wheel. Here, NC (numerical controller) acts to control the two axes, that is to position an X-axis (traverse feed of the work table) and a Z-axis (setting depth of cut of the grinding wheel).

The designing of this grinding machine is characterized by:
(1) T-shaped surface arrangements of X-axis and Z-axis; closed-loop positioning without using bolts; laser scale: 10 nm.
(2) V—V sliding guide surface; low-thermal expansion cast iron.
(3) Straightness in-process correction with standardized straight gauge.

This grinding machine has such a performance that its contour grinding is carried out at a command resolution of 10 nm.

The generating line of the grinding wheel is produced by controlling the positioning of the conditioning wheel with the X- and Z-axes, to thereby make it possible to obtain a desired, precise shape.

Figure 4:
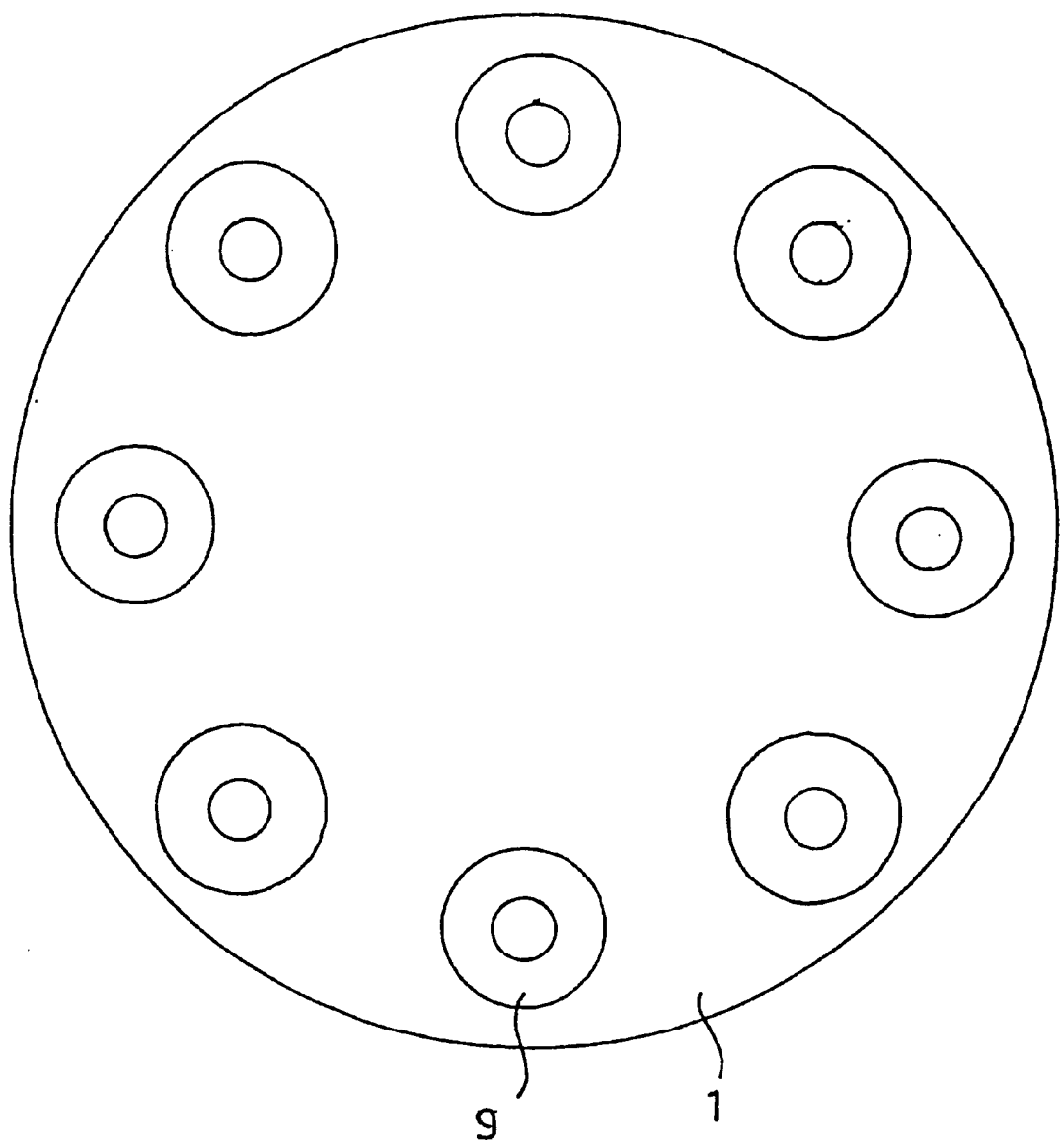
FIG. 4 is a schematic view showing setting states of a plurality of workpieces to a work table in the grinding machine of FIG. 3.

Also, in order to subject surfaces of a substrate to grinding so as to produce grinding marks in arc patterns, the workpieces may be fixed to the work table as shown, for example, in FIG. 4.

In order to subject the brittle materials to grinding without causing any substantially microcracks therein, the depth of cut of the individual abrasive grains must be kept at a level equal to or lower than the ductile-brittle transition point ("dc"). In order to carry out grinding under such conditions, grinding machines with high rigidity and high precision are required.

This grinding machine satisfy the following conditions: The rigidity of the spindle of the grinding wheel alone is 1300 N/μm or more; the rigidity of spindle of the work table alone is 1000 N/μm or more; and the loop rigidity between the tool and the workpiece is 150 N/μm or more. Therefore, the grinding machine satisfies the conditions mentioned above.

Here, a run-out in a thrusting direction of the work table, a run-out in a radial direction of the spindle of the grinding wheel, and a run-out of the grinding wheel after truing are, respectively, preferably 100 nm or less for all cases. The positioning of the X-axis and the Z-axis is controlled by a laser scale having a resolution of 10 nm, thereby reducing an error in setting depths of cut to 100 nm or less.

Further, the substrate is subjected to a ductile-mode grinding by electrolytic in-process dressing (hereinafter simply referred to as "ELID"), to thereby conduct grinding at high precision and high efficiency. Specifically, in a grinding machine, an ELID-type ductile-mode grinding can be achieved by using fixed abrasive grains as a metal-bonded wheel, wherein the abrasive grains are fixed on the peripheral surface of the straight wheel with a metallic binder; arranging electrodes so as to cover a part of the peripheral surface of the grinding wheel; supplying an aqueous coolant solution containing electrolytes between the peripheral surface of the grinding wheel and the workpiece; applying a positive electric field on the side of the grinding wheel; and grinding the substrate while rotating both the substrate and the grinding wheel.

Also, the fixed abrasive grains (grinding wheel) usable in grinding process in step (a) are not particularly limited, and any of known ones generally used in the art may be employed. The kinds of the abrasive grains, shapes, grain sizes, bonding agents, and shapes of the grinding wheel may differ depending upon the substrate materials, the extent of intermediary grinding, and stock removal, and these factors cannot be generalized. For instance, in the case where grinding is carried out under such condition that the above grinding machine "HPG-2A" is used, that the substrate is a carbon substrate, and that an intermediary grinding is conducted to achieve a level of Ra of 100 nm, with a stock removal of 20 μm per side, industrial diamonds are used for the abrasive grains, the abrasive grains having an average grain size of preferably from 0.005 to 5 μm, more preferably from 0.05 to 5 μm, still more preferably from 1 to 5 μm, particularly from 1 to 2.5 μm, and metals are used for the bonding agents. In addition, in the case where the ELID method is employed, the bonding agents are preferably Fe (cast iron, etc.), Cu, Ni, etc., which may be used alone or as alloys containing one or more of them. Also, in this case, other conditions, such as the peripheral speed of the grinding wheel, the feeding speed, and the rotational speed of the work table, are not particularly limited, and they may at a generally employed level.

By step (a) described above, a surface-worked substrate having grinding marks in arc patterns can be obtained without generating substantially any microcracks. The resulting surface-worked substrate has an Ra of preferably from 1 to 100 Å, more preferably from 2 to 50 Å, particularly from 2 to 30 Å, wherein the Ra is an arithmetical mean deviation of the profile taken perpendicular to the grinding marks in arc patterns. From the viewpoint of grinding efficiency, the Ra is preferably 1 Å or more, and from the viewpoint of achieving excellent ductile-mode grinding, the Ra is preferably 100 Å or less. In addition, the surface-worked substrate has an Rp/Ra ratio of preferably from 2 to 10, more preferably from 2 to 8, particularly 2 to 4, wherein the Rp is a maximum profile peak height and the Ra is defined as above. Here, from the viewpoint of reducing managemental loads in the truing process (shape correction) of the grinding wheel, the Rp/Ra ratio is preferably 2 or more, and from the viewpoint of maintaining the ductile-mode grinding, the Rp/Ra ratio is preferably 10 or less. Incidentally, Rp may be measured by a stylus-type profilometer "Type P2" (manufactured by Tencor) under the same conditions as the measurement of the Ra described above. Further, the flatness of the resulting surface-worked substrate is preferably 10 μm or less, more preferably 6 μm or less from the viewpoint of floating stability of a magnetic head. The above surface-worked substrate is subjected to ductile-mode grinding with substantially no microcracks and having a small Ra, thereby making it highly suitable for the production of the magnetic recording media.

Step (b)

The magnetic recording media of the present invention have the desired effects by using either (i) a surface-worked substrate having grinding marks in arc patterns after subjecting the substrate to ductile-mode grinding; or (ii) a mirror-polished substrate obtained by further subjecting the above surface-worked substrate to a finish polishing. Therefore, the materials, thicknesses, and forming methods for the recording medium-constituting layers are by no means particularly limited, and any of known ones can be usually used. Step (b) will be explained in further detail below.

The recording medium-constituting layers formed on the surface-worked substrate comprise at least an under layer, a magnetic layer, and a protective layer.

The under layer is formed between the substrate and the magnetic layer for the purpose of improving the orientation of the magnetic layer. The thicknesses and materials used for the under layer are not particularly limited, and any of known thicknesses and materials used in the art may be employed. The under layer may comprise a single layer or a plurality of layers. Examples of the materials used include aluminum alloys, such as Al—Si alloys, Ti, carbon, Cr, or Cr alloys. Such an under layer may be formed by known methods utilizing such means as PVD.

The magnetic layers include, for instance, those of metal thin film types formed by means of PVD. The materials constituting the magnetic layers, and any of known ones generally employed in the art may be used. Examples thereof include Co-based magnetic alloys comprising Co as a main component, such as CoCr, CoCrX, CoCrPtX, CoNiX, CoW, CoSm, and CoSmX. Here, X stands for one or more elements selected from the group consisting of Ta, Pt, Au, Ti, V, Cr, Ni, W, La, Ce, Pr, Nd, Cu, Pm, Sm, Eu, Li, Si, B, Ca, As, Y, Zr, Nb, Mo, Ru, Rh, Ag, Sb, and Hf. Among these Co-based alloys, from the viewpoints of giving high-outputs and corrosion resistance in the resulting magnetic recording medium, CoCr and CoCrPt are preferably used. Each of the elements in the alloys has a weight ratio of the level of known ones. This magnetic layer has a film thickness of preferably from 10 to 100 nm, particularly from 20 to 60 nm. From the viewpoint of having high-outputs in the resulting magnetic recording medium, the film thickness is preferably 10 nm or more, and from the viewpoint of having reduced noise, the film thickness is preferably 100 nm or less.

The protective layer formed on the magnetic layer is formed by such methods as PVD, CVD, and spin-coating method. From the viewpoint of giving sufficient wear resistance, the protective layer is preferably constituted by materials having high mechanical strength. The materials constituting the protective layer are not particularly limited, and any of known ones generally employed in the art may be used. For example, one or more compounds or alloys selected from the group consisting of oxides of such elements as Al, Si, Ti, Cr, Zr, Nb, Mo, Ta, and W (e.g. silicon oxide and zirconium oxide); nitrides (boron nitride); carbides (e.g. silicon carbide and tungsten carbide); carbons, such as diamond-like carbon and glassy carbon; alloys of Al and carbide-forming metals. Among these materials, a preference is given to silicon oxide, zirconium oxide, boron nitride, silicon carbide, tungsten carbide, carbons, and alloys of Al and carbide-forming metals, or composites the above compounds or alloys.

Incidentally, in the present specification, the term "carbide-forming metals" means metals capable of forming carbides by heat, physical adsorption, and chemical adsorption, which specifically include such metals as Si, Cr, Ta, Ti, Zr, Y, Mo, W, and V.

The protective layer described above has a film thickness of preferably from 5 to 50 nm, particularly from 5 to 25 nm. From the viewpoint of coating entire surfaces, the film thickness is desirably 5 nm or more, and from the viewpoint of reduced spacing losses in the magnetic flux energy, the film thickness is desirably 50 nm or less, without intending to limit the film thickness to the above range.

In addition, in the present invention, in order to improve the sliding stability of the magnetic head, a lubricant layer may be provided by a known method, for instance, by a coating method, to thereby provide a layer with a desired thickness. The lubricants used herein are not particularly limited, any of known ones usually used in the art may be employed. For instance, perfluoropolyethers having a weight-average molecular weight of from 2000 to 10000 may be used, including "FOMBLIN AM2001" (manufactured by Aujimont), "FOMBLIN Z03" (manufactured by Aujimont), and "DEMNAM SP" (manufactured by Daikin Industries). The lubricant may be applied singly, or a mixture of a plurality of lubricants may be applied. Alternatively, a lubricant may be singly applied after applying a different lubricant. In order to carry out coating by such a method, the thickness of the lubricating layer is preferably from 0.2 to 5.0 nm, particularly from 0.5 to 3.0 nm. Here, from the viewpoint of obtaining lubricating effects, the thickness of the lubricant layer is preferably 0.2 nm or more, and from the viewpoint of reducing spacing losses, the thickness is preferably 5.0 nm or less.

In the magnetic recording medium of the present invention, from the viewpoint of inhibiting the adsorption of the magnetic head, ruggedness may be formed on the medium. Here, the formation of rugged surfaces, i.e. further surface-working of the surfaces of the substrate, is achieved in at least one of the layers formed on the substrate, including the under layer, the magnetic layer, and the protective layer.

The formation of the rugged surfaces in each layer may be achieved by any of known methods, including dry-etching, ion milling, ion bombarding, and sputtering methods; formation of clusters by PVD; formation of an island-structure protective layer; and anodic oxidation, thermal oxidation, laser irradiation, and powder beaming (abrasive grain spraying).

Incidentally, as for the features not particularly explained in detail above, similar methods to conventionally known methods for producing magnetic recording media may be employed without limitation.

1-2 Method of Embodiment (2)

Step (a)

Step (a) of this embodiment comprises subjecting surfaces of a substrate to grinding by ductile-mode grinding with a grinding wheel having a setting depth of cut of from 0.05 to 20 $\mu$m, to give a surface-worked substrate having grinding marks in arc patterns. Here, step (a) is the same process as step (a) in Embodiment (1).

Step (b')

Step (b') comprises further subjecting the surface-worked substrate obtained in step (a) to a finish polishing, to give a mirror-polished substrate.

The surface-worked substrate obtainable in step (a) has a thinner work damaged layer than those of conventional substrates, so that the stock removal during the finish polishing in this step can be made notably small, thereby making it possible to shorten the polishing time required for the finish polishing.

The finish polishing in step (b') is carried out by known methods usually employed in the art, including a method of polishing using a polishing liquid comprising water and abrasive grains as base polishing materials and further containing polishing aids. The abrasive grains may be any known ones, including artificial diamond, $\gamma$-alumina, WA alumina, cerium oxide, and silica gel. The abrasive grains have a particle size of preferably from 0.001 to 5.0 $\mu$m, more preferably from 0.002 to 1.0 $\mu$m. From the viewpoint of shortening the polishing time, the particle size of the abrasive grains is preferably 0.001 $\mu$m or more, and from the viewpoint of suppressing the increase in damages, the particle size is preferably 5.0 $\mu$m or less. The concentration of the abrasive grains in the polishing liquid may be preferably from 0.1 to 10% by weight.

The polishing aids may be any known ones, including aluminum nitrate, aluminum sulfate, magnesium sulfate, aluminum chloride, iron chloride, iron nitrate, and chromium oxide. The concentration of the polishing aid in the polishing liquid may be preferably 0.1 to 10% by weight. Also, as for polishing machines, carriers, pads, etc., any of known ones generally employed in the art may be used.

Using the polishing liquid and the polishing machine mentioned above, the surface-worked substrate obtained in step (a) is subjected to a finish polishing. The stock removal is preferably from 1.1 to 2.0 times the thickness of the work damaged layer. Specifically, the stock removal may be preferably 0.002 to 10 $\mu$m, though it may depending upon the Ra of the surface-worked substrate obtained in step (a). In addition, the applied pressure and the polishing time differ depending upon the materials for substrates, the stock removal, the kinds of the polishing liquids used and thus being difficult to generalize them. For instance, the applied pressure may be preferably from 20 to 2000 gf/cm$^2$, more preferably from 50 to 300 gf/cm$^2$, and the polishing time may be preferably from 1 to 60 minutes, more preferably from 2 to 30 minutes. The polishing pad which is attached to the lap plate of the double-sided polishing machine has a Shore A hardness of preferably from 40 to 100, more preferably from 60 to 100.

The lap plate of the double-sided polishing machine has a rotational speed of preferably from 10 to 100 rpm, more preferably from 20 to 60 rpm. In addition, although the flow rate of the polishing liquid depends on the size of the polishing machine, the flow rate may be, for instance, from 5 to 500 cc/min, preferably from 10 to 50 cc/min when the size is in the scale of 9B (9 inches). Incidentally, the term "work damaged layer" in the present specification refers to a portion containing such damages as microcracks, scratches, and pits caused by surface working, such as grinding and polishing.

The mirror-polished substrate obtained as described above has an Ra of preferably from 1 to 20 Å, more preferably from 1 to 10 Å. From the viewpoint of grinding efficiency, the Ra is preferably 1 Å or more, and from the viewpoints of the floating properties and the sliding properties of the magnetic head, the Ra is preferably 20 Å or less. Further, the mirror-polished substrates having a flatness of 10 $\mu$m or less are preferred from the viewpoint of providing excellent floating stability of the magnetic head. More preferably, the flatness is 6 $\mu$m or less.

Step (c)

Step (c) comprises forming recording medium-constituting layers at least comprising an under layer, a magnetic layer, and a protective layer on the mirror-polished substrate obtained in step (b') from which the magnetic recording medium is produced. This process is basically similar to step (b) of Embodiment (1) except for forming the record medium-constituting layers on a mirror-polished substrate instead of the surface-worked substrate.

2. Magnetic Recording Medium of the Present Invention

The magnetic recording medium of the present invention is produced by forming recording medium-constituting layers at least comprising an under layer, a magnetic layer, and a protective layer on the surface-worked substrate, or on the mirror-polished obtained by further subjecting the surface-worked substrate to a finish polishing.

Here, as for the surface-worked substrate, those subjected to grinding by a ductile-mode grinding are suitably used, because substantially no microcracks are generated even in the brittle materials. Further, the ductile-mode grinding may be preferably carried out with an ELID, because the grinding can be carried out at high precision and high efficiency.

Also, the surface-worked substrate has an Ra of preferably from 1 to 100 Å, more preferably from 2 to 50 Å, particularly from 2 to 30 Å. From the viewpoint of grinding efficiency, the Ra is preferably 1 Å or more, and from the viewpoint of the floating properties of the magnetic head, the Ra is preferably 100 Å or less. Also, the Rp/Ra ratio is preferably from 2 to 10, more preferably from 2 to 8, particularly from 2 to 4. Here, from the viewpoint of reducing the managemental loads in the truing process of the grinding wheel used, the Rp/Ra ratio is preferably 2 or more, and from the viewpoint of surface-sliding durability, the Rp/Ra ratio is preferably 10 or less. The surface-worked substrate has a flatness of preferably 10 μm or less, more preferably 6 μm or less from the viewpoint of floating stability of the magnetic head.

The mirror-polished substrate is obtainable by further subjecting the surface-worked substrate to a finish polishing. Although the Ra of the mirror-polished substrate is not particularly limited, the Ra is preferably from 1 to 20 Å, more preferably from 1 to 10 Å. In addition, the mirror-polished substrate has a flatness of from 10 μm or less, more preferably from 6 μm or less.

Also, the materials, thicknesses and forming methods employed for the recording medium-constituting layers are not particularly limited, and any of known ones as mentioned in the description of the production method of the present invention given above may be used.

Further, as for substrate materials, brittle materials are particularly suitably used, which may be exemplified by carbons, glasses, ceramics such as SiC, silicon. Among them, carbons are particularly preferred because they have excellent grinding stability and low Ra's. The above magnetic recording medium of the present invention can be produced, for instance, by the method of the present invention as detailed above.

As described in the present invention, the magnetic recording medium having remarkably lowered error properties can be efficiently produced by a relatively simpler method than a conventional method. Also, the magnetic recording medium of the present invention is highly desired because it has notably reduced error properties.

EXAMPLES

The present invention is hereinafter described in more detail by means of the following production examples, working examples, and comparative examples, without intending to restrict the scope of the present invention thereto.

Production Example 1

A furfuryl alcohol resin was subjected to a known molding treatment and a preliminary baking treatment, to produce a carbon substrate. More specifically, the carbon substrate was produced by the following method. Five-hundred parts by weights of furfuryl alcohol, 400 parts by weight of a 92% by weight formaldehyde aqueous solution, and 30 parts by weight of water were added and stirred at 80° C. to dissolve the components. Next, under stirring, to the above mixed solution, a mixed solution comprising 520 parts by weight of phenol, 9.5 parts by weight of calcium hydroxide, and 45 parts by weight of water was added dropwise, and the components were allowed to react with one another at 80° C. for three hours. Thereafter, 80 parts by weight of phenol and the above mixed solution comprising phenol/calcium hydroxide/water were further added dropwise to the resulting reaction mixture, to allow the components to react with one another at 80° C. for two hours. After the resulting reaction mixture was cooled to 30° C., it was neutralized with 30% by weight paratoluenesulfonic acid aqueous solution. The resulting neutralized product was subjected to dehydration treatment under a reduced pressure, thereby removing 170 parts by weight of water. To the obtained mixture after dehydration, 500 parts by weight of furfuryl alcohol were added and blended, and the resulting mixture was subjected to filtration, to thereby remove the insoluble components in the resinous mixture with a membrane filter. The maximum water content of the resulting resin was measured to be 35% by weight.

To 100 parts by weight of the resulting thermosetting resin, 0.5 parts by weight of a mixed solution comprising 70% by weight of paratoluenesulfonic acid, 20% by weight of water, and 10% by weight of cellosolve were added and sufficiently stirred. Thereafter, the resulting mixture was poured into a disc-shaped die having a thickness of 2 mm, and the filled die was subjected to defoaming treatment under a reduced pressure. Next, the resulting defoamed product was heat-cured at 50° C. for three hours, and then at 80° C. for two days. The heat-cured product was worked into a given donut shape. Thereafter, under a nitrogen gas atmosphere in an organic material baking furnace, the donut-shaped product was heated up to a temperature of 700° C. at a heating rate of 2–5° C./hour, and then heated and baked up to a temperature of 1200° C. at a heating rate of 5–20 C./hour. The resulting mixture was maintained at 1200° C. for two hours, and then cooled, to give a carbon substrate having a 1.8 inch diameter. Hereinafter, this carbon substrate is referred to as "non-abrasive carbon substrate." The resulting non-abrasive carbon substrate had an Ra of 10 μm, a density of 1.5 g/cm$^3$, and a Vickers hardness of 650, and comprised amorphous carbon.

The resulting non-abrasive carbon substrate prepared as above was placed in a double-sided lapping machine "9B5L" (manufactured by Speedfarm) and then subjected to a loose abrasive lapping with a 4% by weight concentration using a GC (green silicon carbide abrasive material) #600 which is a kind of pulverized silicon carbide abrasive grains. Here, the lap plate was made of cast iron, and the stock removal was 300 μm for each side. The resulting carbon substrate had an Ra of 2 μm. Thereafter, the carbon substrate was subjected to a chamfering working at 45° by using a chamfering machine "SG-T" (manufactured by Shiba Giken) to obtain a carbon substrate with desired dimensions for inner and outer diameters.

Production Example 2

The carbon substrate obtained in Production Example 1, which was already subjected to lapping as described above, was further subjected to lapping under the conditions given below. The carbon substrate was subjected to a loose abrasive lapping with a 20% by weight concentration using the same grinding machine as in Production Example 1 but different grinding grains "GC#4000." Here, the lap plate was made of cast iron, and the stock removal was 50 μm for each side. The resulting carbon substrate had an Ra of 0.1 μm. Thereafter, the carbon substrate was subjected to a chamfering working at 45° by using a chamfering machine "SG-T" (manufactured by Shiba Giken) to obtain a carbon substrate with inner and outer diameters being cut to a given even length.

Example 1

The carbon substrate obtained in Production Example 1 (Ra: 2 μm) was subjected to finish grinding by ductile mode grinding, to produce a surface-worked substrate. The primary treatment conditions were as follows:

Grinding machine: Ultraprecision, horizontal plane grinding machine ("HPG-2A," manufactured by Kabushiki Kaisha Nisshin Kikai Seisakusho);

Diameter of rotary work table: 200 mm;

Rotational speed of rotary work table: 530 r.p.m.;

Peripheral speed of grinding wheel: 1260 m/min;
Feeding rate of grinding wheel: 60 mm/min;
Kinds of Abrasive Grains:
"#600 DIAMOND" (average grain size: about 20 $\mu$m) (a metal bond grinding wheel: "SD600F75M" manufactured by Noritake Diamond Kabushiki Kaisha); or
"#8000 DIAMOND" (average grain size: about 1.8 $\mu$m) (an iron fiber bond grinding wheel: "SD8000N100FX3" manufactured by Shintobrator);
Coolant: 2% by weight aqueous solution of ELID No.35, manufactured by Yushiro Kagaku;
ELID power source: Pulse power source "EDP-10A," manufactured by Shintobrator;
Initial Truing: "#200 DIAMOND" (average grain size: about 75 $\mu$m) ("SD200Q75M" manufactured by Kabushiki Kaisha Oriental Diamond Tools Research and Development Laboratory);
Initial dressing: 3A×15 minutes; and (Rectangular) pulse cycle: 4 microsec/cycle.

Figure 5:
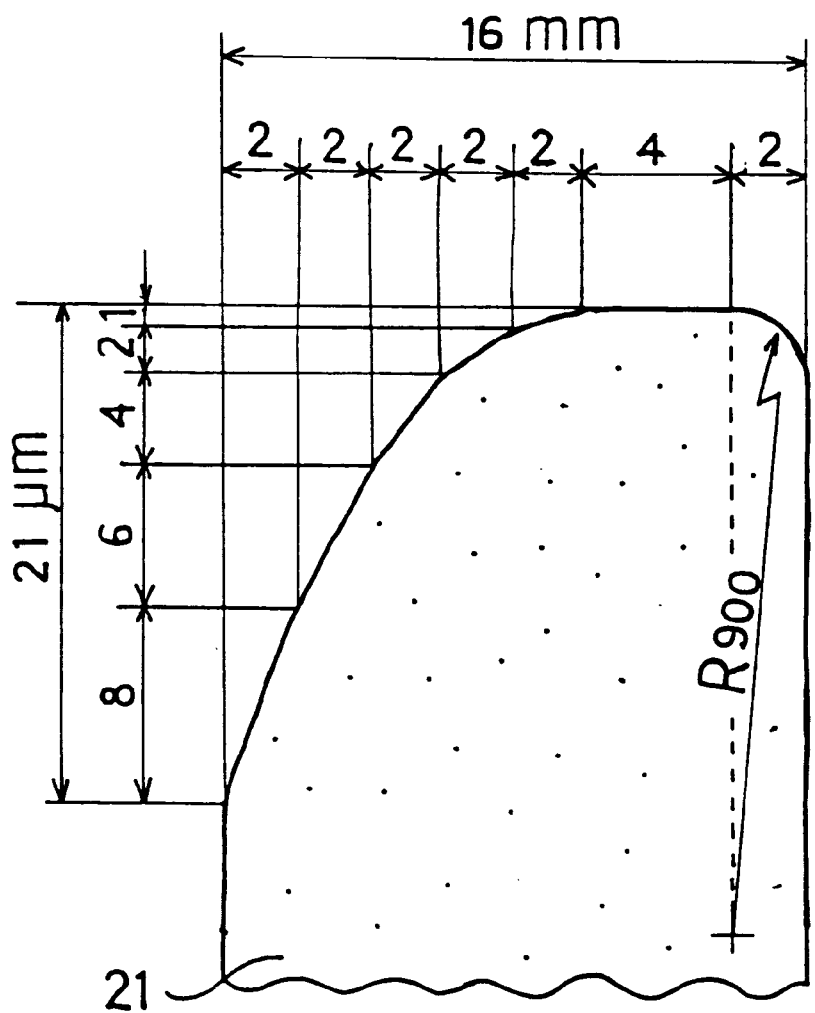
FIG. 5 is a schematic view showing a generating line of the shoulder portion of the grinding wheel.
Figure 6:
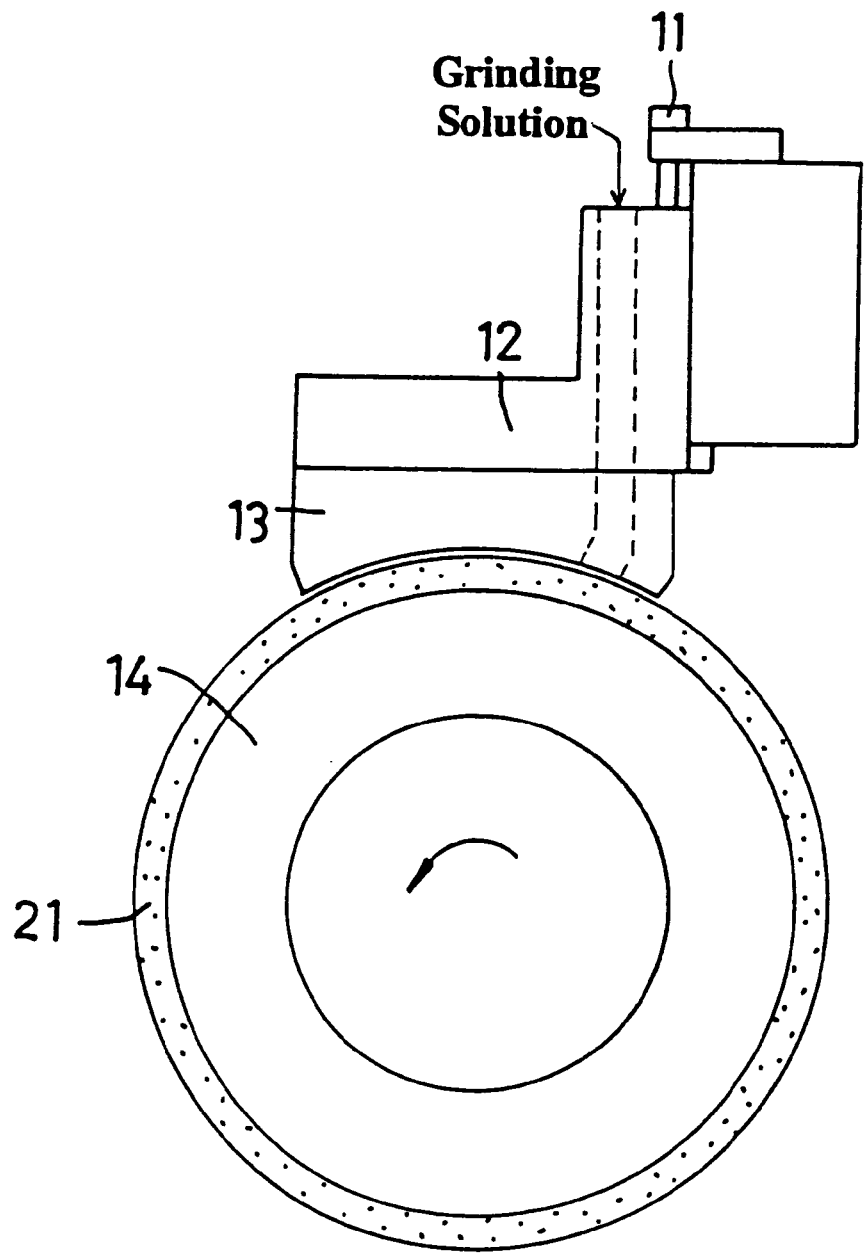
FIG. 6 is a schematic view showing an arrangement of an ELID electrode.

The shoulders of the grinding wheel were subjected to precision truing to trim into a shape of generating line as shown in FIG. 5 as one example thereof. Here, the individual abrasive grains were set to have depths of cut of equal to or less than the ductile-brittle transition point (about 50 nm) of the carbon substrate. The substrate was fixed to the work table by utilizing a large number of vacuum suction pores provided on the work table. The grinding was carried out with a "#600 DIAMOND" grinding wheel having a setting depth of cut of 15 $\mu$m for 6 runs, and then with a "#8000 DIAMOND" grinding wheel with setting depths of cut of 8 $\mu$m, 4 $\mu$m, and 2 $\mu$m for one run each. The grinding process was carried out for both sides of the substrate. The chamfering was carried out by similar procedures as in Production Example 1 after grinding the substrate using the "#600 DIAMOND" grinding wheel. Incidentally, the setting states of the substrates to be worked (workpieces) which were fixed to the work table are shown in FIG. 4. A schematic view showing arrangements of ELID electrodes is shown in FIG. 6. The resulting surface-worked substrate was observed with an optical microscope, and it was found to have grinding marks of arc patterns. The arc patterns were found to have no intersection therebetween.

Figure 7:
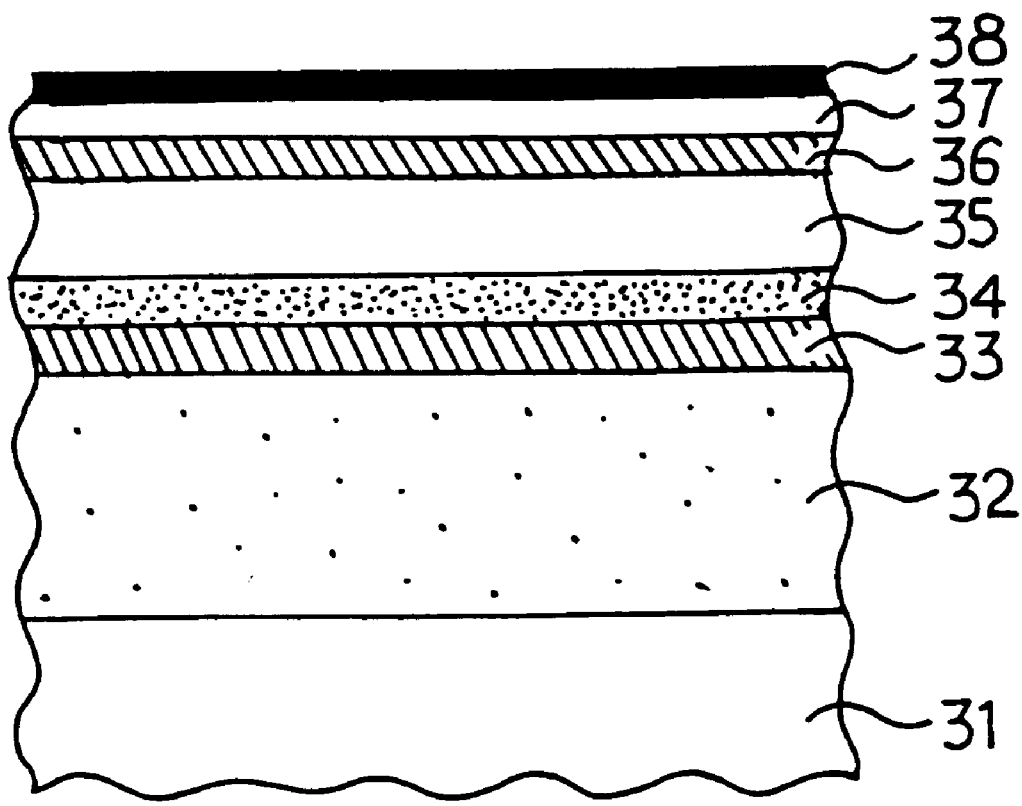
FIG. 7 is a partial cross-sectional view showing a magnetic recording medium of the present invention.

On this surface-worked substrate 31, a Ti layer 32 having a thickness of 100 nm was formed by a DC magnetron sputtering method while keeping the conditions of an argon gas pressure of 3 mTorr and a substrate temperature of 180° C. Next, an Al—Si alloy layer 33 having a thickness of 30 nm was formed on the Ti layer 32 by a DC magnetron sputtering method under the conditions of an argon gas pressure of 3 mTorr and a substrate temperature of 180° C. Thereafter, a carbon layer 34 having a thickness of 20 nm, a Cr layer 35 having a thickness of 40 nm, and a Co—Cr—Pt—B magnetic alloy layer 36 having a thickness of 40 nm were sequentially formed on the Al—Si alloy layer 33 by a DC magnetron sputtering method. Incidentally, when the layers 32 to 36 were formed, a bias voltage of −200 V was applied to the substrate except for the layers 33 and 34. Further, on the Co—Cr—Pt—B magnetic alloy layer 36, a protective layer (glassy carbon layer) 37 having a thickness of 15 nm was formed by DC magnetron sputtering. Subsequently, the resulting substrate was impregnated with a solution of "FOMBLIN Z03" (manufactured by Aujimont) to apply a coating thereon, so that a lubricant layer 38 having a thickness of 15 nm was formed, to give a magnetic recording medium as shown in FIG. 7.

Example 2

The carbon substrate obtained in Production Example 2 (Ra: 0.1 $\mu$m) was subjected to finish grinding by ductile mode grinding under similar conditions to those of Example 1 except for the following, to produce a surface-worked substrate. Also, the resulting surface-worked substrate was used to produce a magnetic recording medium. The grinding and the production of the magnetic recording medium were carried out by procedures similar to those of Example 1.

Kinds of abrasive grains:
"#2000 DIAMOND" (average grain size: about 6 $\mu$m) (an iron fiber bond grinding wheel: "SD200N100FX" manufactured by Shintobrator); or
"#12000 DIAMOND" (average grain size: about 1.2 $\mu$m) (an iron fiber bond grinding wheel: "SD12000N100FX3" manufactured by Shintobrator);
Setting depths of cut of grinding wheel:
The case where "#2000 DIAMOND" was used:
Depth: 8 $\mu$m, for three runs;
The case where "#12000 DIAMOND" was used:
(1) Depth: 2 $\mu$m, for two runs; or
(2) Depth: 0.5 $\mu$m, for one run.

Figure 8:
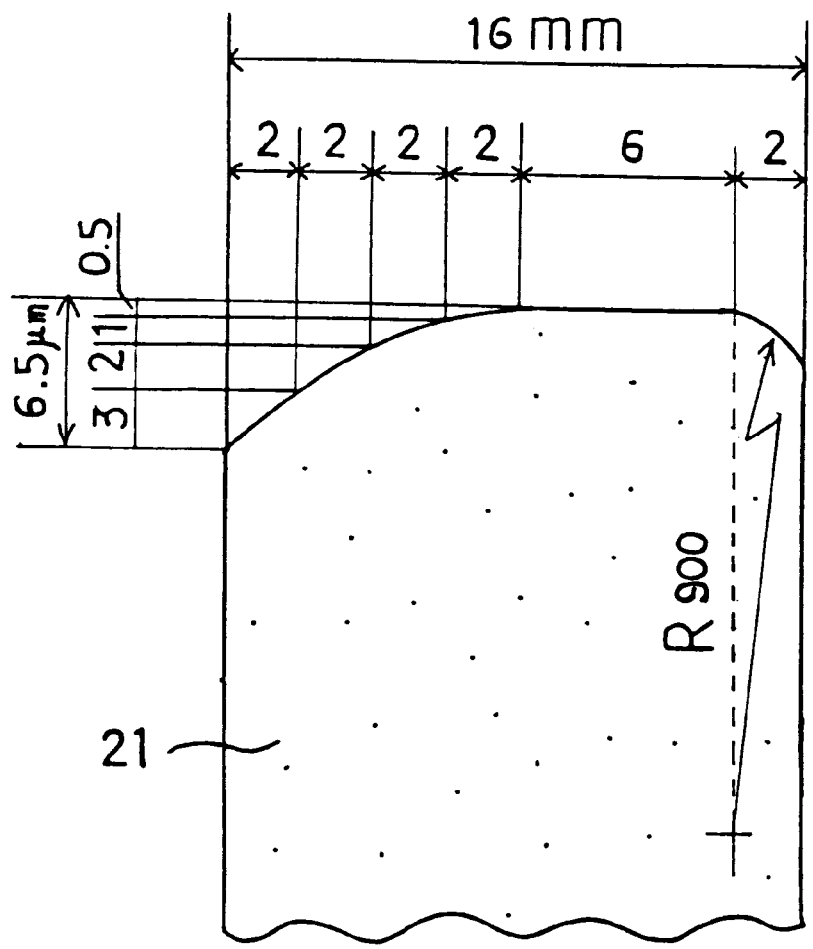
FIG. 8 is a schematic view showing an outline of a generating line of the shoulder portion of the grinding wheel.

The shoulders of the grinding wheel were subjected to precision truing to trim into a shape of generating line as shown in FIG. 8 as one example thereof. Here, the individual abrasive grains were set to have depths of cut of equal to or less than the ductile-brittle transition point (about 50 nm) of the carbon substrate.

Incidentally, the resulting surface-worked substrate was observed with an optical microscope, and it was found to have grinding marks of arc patterns. The arc patterns were found to have no intersection therebetween.

Example 3

The carbon substrate obtained in Production Example 2 was subjected to finish grinding by ductile mode grinding, to produce a surface-worked substrate. Also, the resulting surface-worked substrate was used to produce a magnetic recording medium. The grinding was carried out by procedures similar to those of Example 1 under the following conditions.

Working Conditions
Grinding machine: Ultraprecision, horizontal plane grinding machine ("HPG-2A," manufactured by Kabushiki Kaisha Nisshin Kikai Seisakusho);
Diameter of rotary work table: 200 mm;
Rotational speed of rotary work table: 530 r.p.m.;
Peripheral speed of grinding wheel: 1260 m/min;
Feeding rate of grinding wheel: 60 mm/min;
Kind of abrasive grains:
"#20000 DIAMOND" (average grain size: about 1.2 $\mu$m) (an iron fiber bond grinding wheel: "SD20000NFX3" manufactured by Shintobrator);
Coolant: 2% by weight aqueous solution of ELID No.35, manufactured by Yushiro Kagaku;
ELID power source: Pulse power source "EDP-10A," manufactured by Shintobrator);
Initial Truing: "#200 DIAMOND" (average grain size: about 75 $\mu$m) ("SD200Q75M" manufactured by Kabushiki Kaisha Oriental Diamond Tools Research and Development Laboratory);
Initial dressing: 3A×15 minutes; and (Rectangular) pulse cycle: 4 microsec/cycle.

The shoulders of the grinding wheel were subjected to precision truing to trim into a shape of generating line as shown in FIG. 8 as one example thereof. Here, the individual abrasive grains were set to have depths of cut of equal to or less than the ductile-brittle transition point (about 50 nm) of the carbon substrate. The substrate was fixed to the work table by utilizing a large number of vacuum suction pores provided on the work table. The grinding was carried out with a "#8000 DIAMOND" grinding wheel having setting depths of cut of 3 μm, 2 μm, and 0.2 μm for one run each. The grinding process was carried out for both sides of the substrate. The setting states of the substrates to be worked which were fixed to the work table are shown in FIG. 4. A schematic view showing arrangements of ELID electrodes is shown in FIG. 6.

Incidentally, the resulting surface-worked substrate was observed with an optical microscope, and it was found to have grinding marks of arc patterns. The arc patterns were found to have no intersection therebetween.

The resulting surface-worked substrate was used to produce a magnetic recording medium by procedures similar to those of Example 1.

Example 4

The carbon substrate obtained in Production Example 2 was subjected to finish grinding by ductile mode grinding, to produce a surface-worked substrate. Also, the resulting surface-worked substrate was used to produce a magnetic recording medium. The grinding was carried out by procedures similar to those of Example 3 under the following conditions.

Working Conditions

Grinding machine: Ultraprecision, horizontal plane grinding machine ("HPG-2A," manufactured by Kabushiki Kaisha Nisshin Kikai Seisakusho);

Diameter of rotary work table: 200 mm;

Rotational speed of rotary work table: 530 r.p.m.;

Peripheral speed of grinding wheel: 1260 m/min;

Feeding rate of grinding wheel: 60 mm/min;

Kind of abrasive grains:

"#8000 DIAMOND" (average grain size: about 1.8 μm) (an iron fiber bond grinding wheel: "SD8000N100FX3" manufactured by Shintobrator);

Coolant: 2% by weight aqueous solution of ELID No.35, manufactured by Yushiro Kagaku;

ELID power source: Pulse power source "EDP-10A," manufactured by Shintobrator);

Initial Truing: "#200 DIAMOND" (average grain size: about 75 μm) ("SD200Q75M" manufactured by Kabushiki Kaisha Oriental Diamond Tools Research and Development Laboratory);

Initial dressing: 3A×15 minutes; and (Rectangular) pulse cycle: 4 microsec/cycle.

The shoulders of the grinding wheel were subjected to precision truing to trim into a shape of generating line as shown in FIG. 5 as one example thereof. Here, the individual abrasive grains were set to have depths of cut of equal to or less than the ductile-brittle transition point (about 50 nm) of the carbon substrate. The substrate was fixed to the work table by utilizing a large number of vacuum suction pores provided on the work table. The grinding was carried out using a grinding wheel with a setting depth of cut of 10 μm for two runs, with a setting depth of cut of 5 μm for two runs, and with a setting depth of cut of 1 μm for one run. The grinding process was carried out for both sides of the substrate. The setting states of the worked substrates to be worked which were fixed to the work table are shown in FIG. 4. A schematic view showing arrangements of ELID electrodes is shown in FIG. 6.

Incidentally, the resulting surface-worked substrate was observed with an optical microscope, and it was found to have grinding marks of arc patterns. The arc patterns were found to have no intersection therebetween.

The resulting surface-worked substrate was used to produce a magnetic recording medium by procedures similar to those of Example 1.

Example 5

The carbon substrate obtained in Production Example 2 was subjected to finish grinding by ductile mode grinding, to produce a surface-worked substrate. Also, the resulting surface-worked substrate was used to produce a magnetic recording medium. The grinding was carried out by procedures similar to those of Example 3 under the following conditions.

Working Conditions

Grinding machine: Ultraprecision, horizontal plane grinding machine ("HPG-2A," manufactured by Kabushiki Kaisha Nisshin Kikai Seisakusho);

Diameter of rotary work table: 200 mm;

Rotational speed of rotary work table: 530 r.p.m.;

Peripheral speed of grinding wheel: 1260 m/min;

Feeding rate of grinding wheel: 10 mm/min;

Kind of abrasive grains:

"#12000 DIAMOND" (average grain size: about 1.2 μm) (an iron fiber bond grinding wheel: "SD12000N100FX3" manufactured by Shintobrator);

Coolant: 2% by weight aqueous solution of ELID No.35, manufactured by Yushiro Kagaku;

ELID power source: Pulse power source "EDP-10A," manufactured by Shintobrator);

Initial Truing: "#200 DIAMOND" (average grain size: about 75 μm) ("SD200Q75M" manufactured by Kabushiki Kaisha Oriental Diamond Tools Research and Development Laboratory);

Initial dressing: 3A×15 minutes; and (Rectangular) pulse cycle: 4 microsec/cycle.

The shoulders of the grinding wheel were subjected to precision truing to trim into a shape of generating line as shown in FIG. 5 as one example thereof. Here, the individual abrasive grains were set to have depths of cut of equal to or less than the ductile-brittle transition point (about 50 nm) of the carbon substrate. The substrate was fixed to the work table by utilizing a large number of vacuum suction pores provided on the work table. The grinding was carried out with a grinding wheel ("#8000 DIAMOND") having setting depths of cut of 3 μm, 2 μm, and 0.1 μm for one run each. The grinding process was carried out for both sides of the substrate. The setting states of the substrates to be worked which were fixed to the work table are shown in FIG. 4. A schematic view showing arrangements of ELID electrodes is shown in FIG. 6.

Incidentally, the resulting surface-worked substrate was observed with an optical microscope, and it was found to have grinding marks of arc patterns. The arc patterns were found to have no intersection therebetween.

The resulting surface-worked substrate was used to produce a magnetic recording medium by procedures similar to those of Example 1.

Example 6

A reinforced glass substrate (inner and outer diameters being previously adjusted; the substrate being previously subjected to chamfering, and Ra: 10 nm) having a diameter of 1.8 inches was subjected to finish grinding by ductile mode grinding, to produce a surface-worked substrate. Also, the resulting surface-worked substrate was used to produce a magnetic recording medium. The grinding and the production of the magnetic recording medium were carried out by procedures similar to those of Example 5.

Feeding rate of grinding wheel: 20 mm/min; and
Setting depths of cut of grinding wheel:
Depth: 5 $\mu$m, for three runs; or
Depth: 1 $\mu$m, for one run.

Incidentally, the reinforced glass substrate used herein has a ductile-brittle transition point of about 25 nm. Also, the resulting surface-worked substrate was observed with an optical microscope, and it was found to have grinding marks of arc patterns. The arc patterns were found to have no intersection therebetween.

Example 7

A crystallized glass substrate (inner and outer diameters being previously adjusted; the substrate being previously subjected to chamfering, and Ra: 0.1 $\mu$m) having a diameter of 1.8 inches was subjected to finish grinding by ductile mode grinding, to produce a surface-worked substrate. Also, the resulting surface-worked substrate was used to produce a magnetic recording medium. The grinding and the production of the magnetic recording medium were carried out by procedures similar to those of Example 6.

Incidentally, the crystallized glass substrate used herein has a ductile-brittle transition point of about 35 nm. Also, the resulting surface-worked substrate was observed with an optical microscope, and it was found to have grinding marks of arc patterns. The arc patterns were found to have no intersection therebetween.

Example 8

A silicon substrate (Ra: 0.1 $\mu$m) which was cut into a disc shape with a diameter of 1.8 inches and previously subjected to chamfering was subjected to finish grinding by ductile mode grinding, to produce a surface-worked substrate. Also, the resulting surface-worked substrate was used to produce a magnetic recording medium. The grinding and the production of the magnetic recording medium were carried out by procedures similar to those of Example 5.

Incidentally, the silicon substrate used herein has a ductile-brittle transition point of about 15 nm. Also, the resulting surface-worked substrate was observed with an optical microscope, and it was found to have grinding marks of arc patterns. The arc patterns were found to have no intersection therebetween.

Comparative Example 1

The carbon substrate obtained in Production Example 2 was subjected to finish polishing by a known method using conventional loose abrasive grains, to produce a surface-worked substrate. Specifically, the working method was carried out by the following method. Using a double-sided polishing machine "9B5P" (manufactured by Speedfarm), 0.45 $\mu$m-alumina abrasive grains ("WA2000" manufactured by Fujimi Incorporated) were supplied in a slurry form, and the carbon substrate was subjected to polishing at an applied pressure of 150 gf/cm$^2$ for 70 minutes. As for carriers, an epoxy-glass material was used, and as for a pad, a hard pad "C14A" (manufactured by Rodel nitta) was used.

The resulting surface-worked substrate was observed with an optical microscope, and it was found to have random scratches with innumerable intersections of the scratches.

Subsequently, the resulting surface-worked substrate was used to produce a magnetic recording medium by procedures similar to those of Example 1.

Comparative Example 2

The carbon substrate obtained in Production Example 2 was subjected to finish polishing in the same manner as in Comparative Example 1 except for using industrial diamond abrasive grains ("DIATECWAM 0.5" manufactured by Fujimi Incorporated), to produce a surface-worked substrate.

The resulting surface-worked substrate was observed with an optical microscope, and it was found to have random scratches with innumerable intersections of the scratches.

Subsequently, the resulting surface-worked substrate was used to produce a magnetic recording medium by procedures similar to those of Example 1.

Comparative Example 3

The carbon substrate obtained in Production Example 1 was subjected to grinding on both sides of the substrate with a cup-shaped grinding wheel by using a vertical, plane grinding machine ("VPG," manufactured by Kabushiki Kaisha Nisshin Kikai Seisakusho) to produce a surface-worked substrate.

Primary Grinding Conditions

Diameter of rotary work table: 400 mm;
Rotational speed of rotary work table: 350 r.p.m.;
Peripheral speed of grinding wheel: 1200 m/min;
Kinds of abrasive grains:
"#600 DIAMOND" (average grain size: about 20 $\mu$m) (a metal bond grinding wheel: "SD600F75M" manufactured by Noritake Diamond Kabushiki Kaisha); or
"#3000 DIAMOND" (average grain size: about 5 $\mu$m) (a resin bond grinding wheel: "SD3000L100B" manufactured by Tokyo Diamond Kougu Seishakusho);
Coolant: Water; and
Initial Truing: "#200 DIAMOND" (average grain size: about 75 $\mu$m) ("SD200Q75M" manufactured by Kabushiki Kaisha Oriental Diamond Tools Research and Development Laboratory).

The depths of cut of the grinding wheel were set at 3 $\mu$m for #600 wheel and 1 $\mu$m for #3000 wheel, and each of the wheels ground off 90 $\mu$m and 16 $\mu$m. The chamfering was carried out by similar procedures as in Production Example 1 after grinding the substrate using the "#600 DIAMOND" grinding wheel.

The resulting surface-worked substrate was observed with an optical microscope, and it was found to have grinding marks with multiple, crisscross patterns.

Subsequently, the resulting surface-worked substrate was used to produce a magnetic recording medium by procedures similar to those of Example 1.

Comparative Example 4

The carbon substrate obtained in Production Example 2 was subjected to grinding on both sides of the substrate with a cup-shaped grinding wheel by using a vertical, plane grinding machine ("VPG," manufactured by Kabushiki Kaisha Nisshin Kikai Seisakusho) to produce a surface-worked substrate.

Primary Grinding Conditions

Diameter of rotary work table: 400 mm;
Rotational speed of rotary work table: 350 r.p.m.;

Peripheral speed of grinding wheel: 1200 m/min;
Kind of abrasive grains:
"#3000 DIAMOND" (average grain size: about 5 µm) (a resin bond grinding wheel: "SD3000L100B" manufactured by Tokyo Diamond Kougu Seishakusho);
Coolant: Water;
Initial Truing: "#200 DIAMOND" (average grain size: about 75 µm) ("SD200Q75M" manufactured by Kabushiki Kaisha Oriental Diamond Tools Research and Development Laboratory); and
Setting depth of cut of grinding wheel: 1 µm.

Under the conditions given above, 30 µm of the surface layer was ground off.

The resulting surface-worked substrate was observed with an optical microscope, and it was found to have grinding marks with multiple, crisscross patterns. Also, it was found to have innumerable intersections of the grinding marks.

Subsequently, the resulting surface-worked substrate was used to produce a magnetic recording medium by procedures similar to those of Example 1.

Comparative Example 5

The reinforced glass substrate having a diameter of 1.8 inches which was the same one as that used in Example 6 was subjected to grinding on both sides of the substrate with a cup-shaped grinding wheel by using a vertical, plane grinding machine ("VPG," manufactured by Kabushiki Kaisha Nisshin Kikai Seisakusho) under the following conditions to produce a surface-worked substrate.

Primary Grinding Conditions

Diameter of rotary work table: 400 mm;
Rotational speed of rotary work table: 350 r.p.m.;
Peripheral speed of grinding wheel: 1200 m/min;
Kind of abrasive grains:
"#3000 DIAMOND" (average grain size: about 5 µm) (a resin bond grinding wheel: "SD3000L100B" manufactured by Tokyo Diamond Kougu Seishakusho);
Coolant: Water;
Initial Truing: "#200 DIAMOND" (average grain size: about 75 µm) ("SD200Q75M" manufactured by Kabushiki Kaisha Oriental Diamond Tools Research and Development Laboratory); and
Setting depth of cut of grinding wheel: 1 µm.

Under the conditions given above, 30 µm of the surface layer was ground off.

The resulting surface-worked substrate was observed with an optical microscope, and it was found to have grinding marks with multiple, crisscross patterns. Also, it was found to have innumerable intersections of the grinding marks.

Subsequently, the resulting surface-worked substrate was used to produce a magnetic recording medium by procedures similar to those of Example 1.

Comparative Example 6

The crystallized glass substrate having a diameter of 1.8 inches which was the same one as that used in Example 7 was subjected to grinding on both sides of the substrate with a cup-shaped grinding wheel by using a vertical, plane grinding machine ("VPG," manufactured by Kabushiki Kaisha Nisshin Kikai Seisakusho) under the following conditions to produce a surface-worked substrate.

Primary Grinding Conditions

Diameter of rotary work table: 400 mm;
Rotational speed of rotary work table: 350 r.p.m.;
Peripheral speed of grinding wheel: 1200 m/min;
Kind of abrasive grains:
"#3000 DIAMOND" (average grain size: about 5 µm) (a resin bond grinding wheel: "SD3000L100B" manufactured by Tokyo Diamond Kougu Seishakusho);
Coolant: Water;
Initial Truing: "#200 DIAMOND" (average grain size: about 75 µm) ("SD200Q75M" manufactured by Kabushiki Kaisha Oriental Diamond Tools Research and Development Laboratory); and
Setting depth of cut of grinding wheel: 1 µm.

Under the conditions given above, 30 µm of the surface layer was ground off.

The resulting surface-worked substrate was observed with an optical microscope, and it was found to have grinding marks with multiple, crisscross patterns. Also, it was found to have innumerable intersections of the grinding marks.

Subsequently, the resulting surface-worked substrate was used to produce a magnetic recording medium by procedures similar to those of Example 1.

Each of the surface-worked substrate obtained in Examples 1 to 8 and Comparative Examples 1 to 6 was evaluated with respect to its shape of working marks (grinding marks were observed for Examples 1 to 8 and Comparative Examples 3 to 6; and random scratches were observed for Comparative Examples 1 and 2), flatness, Ra, and Rp/Ra. In cases of the surface-worked substrates with working marks, including ones with the grinding marks and ones with grinding marks in multiple, crisscross patterns except for those with random scratches, the roughness (Ra, Rp) measurement was obtained by scanning with a stylus-type profilometer in a direction perpendicular to the grinding marks, namely in a direction of the maximum profile peak height under the conditions previously described.

The shape of the working marks on the surface-worked substrate was determined by observation of its surface with an optical microscope.

The flatness was measured by using "MARK 4" manufactured by ZYGO.

The results are collectively shown in Tables 1 and 2.

Further, the surface of the surface-worked substrate was observed with an optical microscope, an SEM (scanning electron microscope), and an AFM (atomic force microscope; "Nano-Scope-III" manufactured by Digital Instruments Incorporation) to confirm whether the grinding proceeded in a ductile mode or a brittle mode. Those with smooth grinding marks were obtained by a ductile mode grinding, whereas those giving rough surfaces without smoothness and containing microcracks remaining therein were obtained by a brittle mode grinding.

Each of the magnetic recording media obtained in Examples 1 to 8 and Comparative Examples 1 to 6 was evaluated with respect to appearance examination and error properties as indices of the level of read-write error.

The appearance examination was conducted under bright lighting by naked eyes to check whether or not any scratches on the magnetic recording medium were found. Here, the proportion of the accepted number of media of the entire media was expressed in percentage.

The error properties were tested for 100 magnetic recording media which were found to be scratch-free by the appearance examination. When the number of errors per medium disc was 15 or less, the disc was evaluated as "accepted product," and the proportion of the accepted product in 100 media was expressed in percentage. Here, the number of errors was measured under the following conditions. As for a magnetic head, a thin-film head manufactured by Yamaha Corporation was used. Here, the entire surface was examined under the conditions of a gap width of 0.4 μm, a track width of 5 μm, a number of windings of 20 turns, a rotational speed of 6000 r.p.m., and a frequency of 6 MHz. Any damages of a size of 1 bit or more per side was defined as an "error." The results are shown in Tables 1 and 2.

examination and error properties (Examples 1 to 8). Therefore, the magnetic recording media of the present invention were excellent in quality with remarkably reduced number of errors, showing that the method for producing the magnetic recording media of the present invention is a remarkably efficient method.

TABLE 1

| | | Properties of Substrates | | | Evaluation of Medium | |
|---|---|---|---|---|---|---|
| Substrate Material | Shape of Working Marks | Flatness (μm) | Ra (Å) | Rp/Ra | Appearance Examination *1 | Percentage of Accepted Products *2 |
| Example Nos. | | | | | | |
| 1 Glassy Carbon | Grinding Marks in Arc Patterns | 2.8 | 25 | 3 | ⊙ | SA |
| 2 Glassy Carbon | Grinding Marks in Arc Patterns | 3.5 | 25 | 3.9 | ⊙ | SA |
| 3 Glassy Carbon | Grinding Marks in Arc Patterns | 2.5 | 25 | 3.4 | ⊙ | SA |
| 4 Glassy Carbon | Grinding Marks in Arc Patterns | 1.8 | 55 | 2.7 | ⊙ | SA |
| 5 Glassy Carbon | Grinding Marks in Arc Patterns | 4.2 | 14 | 2.8 | ⊙ | SA |
| 6 Reinforced Glass | Grinding Marks in Arc Patterns | 6.1 | 30 | 3.7 | ○ | A |
| 7 Crystallization Glass | Grinding Marks in Arc Patterns | 6.3 | 36 | 3.9 | ○ | A |
| 8 Silicon | Grinding Marks in Arc Patterns | 4.5 | 33 | 3.8 | ○ | A |

*1 ⊚: 95% or more. ⊙: 90% or more and less than 95%.
*2 SA: 90% or more. A: 80% or more and less than 90%.

TABLE 2

| | | Properties of Substrates | | | Evaluation of Medium | |
|---|---|---|---|---|---|---|
| Substrate Material | Shape of Working Marks | Flatness (μm) | Ra (Å) | Rp/Ra | Appearance Examination *1 | Percentage of Accepted Products *2 |
| Comparative Example Nos. | | | | | | |
| 1 Glassy Carbon | Random Scratches | 4.5 | 20 | 5.7 | ⊙ | SA |
| 2 Glassy Carbon | Random Scratches | 4.6 | 8.1 | 5.4 | ○ | B |
| 3 Glassy Carbon | Grinding Marks in Multiple, Crisscross Patterns | 10.1 | 65 | 4.1 | Δ | C |
| 4 Glassy Carbon | Grinding Marks in Multiple, Criss-Crossed Patterns | 9.2 | 57 | 4.2 | Δ | C |
| 5 Reinforced Glass | Grinding Marks in Multiple, Crisscross Patterns | 11.1 | 75 | 4.0 | Δ | C |
| 6 Crystallization Glass | Grinding Marks in Multiple, Crisscross Patterns | 9.5 | 81 | 4.6 | Δ | C |

*1 ○: 90% or more and less than 95%. Δ: less than 90%.
*2 B: 50% or more and less than 80%. C: less than 50%.

The above results revealed the following.

The magnetic recording media obtained by the method of the present invention had excellent results in the appearance In addition, according to observations made with the optical microscope and SEM, the abrasion surface was smooth containing no microcracks therein, thereby having remarkably smooth grinding marks. Therefore, it was found that the surface-worked substrate obtained in Examples 1 to 8 were all subjected to grinding by ductile mode grinding.

By contrast, the magnetic recording media obtainable by using the surface-worked substrates worked by conventional loose abrasive grains had notably poor error properties (Comparative Examples 1 and 2).

In addition, the recording magnetic media having grinding marks in the form of multiple, crisscross patterns also had poor error properties. It was found by observing the surface-worked substrates with the optical microscope and SEM that the grinding marks by the ductile mode grinding and the grinding marks by the brittle mode grinding were present, presumably owing to microcracks caused by the intersections of the grinding marks (Comparative Examples 3 to 6). Moreover, all of Comparative Examples showed poor appearance examination results, so that the production methods employed in Comparative Examples could be said to have poor efficiency.

Production Example 3

A furfuryl alcohol resin was subjected to a known molding treatment and a preliminary baking treatment, to produce a carbon substrate. More specifically, the carbon substrate was produced by the following method. Five-hundred parts by weights of furfuryl alcohol, 400 parts by weight of a 92% by weight formaldehyde aqueous solution, and 30 parts by weight of water were added and stirred at 80° C. to dissolve the components. Next, under stirring, to the above mixed solution, a mixed solution comprising 520 parts by weight of phenol, 9.5 parts by weight of calcium hydroxide, and 45 parts by weight of water was added dropwise, and the components were allowed to react with one another at 80° C. for three hours. Thereafter, 80 parts by weight of phenol and the above mixed solution comprising phenol/calcium hydroxide/water were further added dropwise to the resulting reaction mixture, to allow the components to react with one another at 80° C. for two hours. After the resulting reaction mixture was cooled to 30° C., it was neutralized with 30% by weight paratoluenesulfonic acid aqueous solution. The resulting neutralized product was subjected to dehydration treatment under a reduced pressure, thereby removing 170 parts by weight of water. To the obtained mixture after dehydration, 500 parts by weight of furfuryl alcohol were added and blended, and the resulting mixture was subjected to filtration, to thereby remove the insoluble components in the resinous mixture with a membrane filter. The maximum water content of the resulting resin was measured to be 35% by weight.

To 100 parts by weight of the resulting thermosetting resin, 0.5 parts by weight of a mixed solution comprising 70% by weight of paratoluenesulfonic acid, 20% by weight of water, and 10% by weight of cellosolve were added and sufficiently stirred. Thereafter, the resulting mixture was poured into a disc-shaped die having a thickness of 2 mm, and the filled die was subjected to defoaming treatment under a reduced pressure. Next, the resulting defoamed product was heat-cured at 50° C. for three hours, and then at 80° C. for two days. The heat-cured product was worked into a given donut shape. Thereafter, under a nitrogen gas atmosphere in an organic material baking furnace, the donut-shaped product was heated up to a temperature of 700° C. at a heating rate of 2–5° C./hour, and then heated and baked up to a temperature of 1200° C. at a heating rate of 5–20 C./hour. The resulting mixture was maintained at 1200° C. for two hours, and then cooled, to give a carbon substrate having a 1.8 inch diameter. The resulting carbon substrate had an Ra of 10 $\mu$m, a density of 1.5 g/cm$^3$, and a Vickers hardness of 650, and comprised amorphous carbon.

Production Example 4

The carbon substrate obtained in Production Example 3 was placed in a double-sided lapping machine "9B5L" (manufactured by Speedfarm) and then subjected to a loose abrasive lapping with a 4% by weight concentration using a GC (green silicon carbide abrasive material) #600 which is a kind of pulverized silicon carbide abrasive grains. Here, the lap plate was made of cast iron, and the stock removal was 300 $\mu$m for each side. The resulting carbon substrate had an Ra of 2 $\mu$m. Thereafter, the carbon substrate was subjected to a chamfering working at 45° by using a chamfering machine "SG-T" (manufactured by Shiba Giken) to obtain a carbon substrate with desired dimensions for inner and outer diameters.

Production Example 5

The carbon substrate obtained in Production Example 4 was further subjected to lapping under the conditions given below. The carbon substrate was subjected to a loose abrasive lapping with a 20% by weight concentration using the same lapping machine as in Production Example 4 but different abrasive grains "GC#4000." Here, the lap plate was made of cast iron, and the stock removal was 50 $\mu$m for each side. The resulting carbon substrate had an Ra of 0.1 $\mu$m.

Example 9

The carbon substrate obtained in Production Example 3 was subjected to finish grinding by ductile mode grinding, to produce a surface-worked substrate. The primary treatment conditions were as follows:

Grinding machine: Ultraprecision, horizontal plane grinding machine ("HPG-2A," manufactured by Kabushiki Kaisha Nisshin Kikai Seisakusho);

Diameter of rotary work table: 200 mm;

Rotational speed of rotary work table: 530 r.p.m.;

Peripheral speed of grinding wheel: 1260 m/min;

Feeding rate of grinding wheel: 60 mm/min;

Kinds of abrasive grains:

"#600 DIAMOND" (average grain size: about 20 $\mu$m; an iron fiber bond grinding wheel: "SD600N100FX3" manufactured by Shintobrator); or "#8000 DIAMOND" (average grain size: about 2 $\mu$m; an iron-based bond grinding wheel: "SD8000N100FX3" manufactured by Shintobrator);

Coolant: 2% by weight aqueous solution of ELID No.35, manufactured by Yushiro Kagaku;

ELID power source: Pulse power source "EDP-10A," manufactured by Shintobrator);

Initial Truing: "#200 DIAMOND" (average grain size: about 75 $\mu$m) ("SD200Q75M" manufactured by Kabushiki Kaisha Oriental Diamond Tools Research and Development Laboratory);

Initial dressing: 3A×15 minutes; and (Rectangular) pulse cycle: 4 microsec/cycle.

The shoulders of the grinding wheels, #600 wheel and #8000 wheel, were subjected to precision truing to trim into shapes of a generating line as shown in FIG. 5 as one example thereof. Here, the individual abrasive grains were set to have depths of cut of equal to or less than the ductile-brittle transition point (about 50 nm) of the carbon substrate. The substrates were fixed to the work table by utilizing a large number of vacuum suction pores provided on the work table.

First, the grinding was carried out with a grinding wheel "#600 DIAMOND" having a setting depth of cut of 15 μm for 6 runs, and then with a "#8000 DIAMOND" grinding wheel having setting depths of cut of 10 μm, 5 μm, and 2 μm for one run each. The grinding process was carried out for both sides of the substrate.

Incidentally, the resulting substrate was subjected to chamfering using the "#600 DIAMOND" grinding wheel by carrying out similar procedures to those in Production Example 4 after grinding the substrate. Incidentally, the setting states of the substrates to be worked which were fixed to the work table are shown in FIG. 4. A schematic view showing arrangements of ELID electrodes is shown in FIG. 6.

The resulting surface-worked substrate was observed with an optical microscope, and it was found to have grinding marks of arc patterns. The arc patterns were found to have no intersection therebetween.

Next, the resulting surface-worked substrate was subjected to a finish polishing by a conventional method using loose abrasive grains, to give a mirror-polished substrate. The primary polishing conditions were as follows. Incidentally, a polishing liquid comprising given amounts of water, abrasive grains, and polishing aids was supplied in a slurry form.

Polishing machine: "9B5P" (manufactured by Speedfarm);

Abrasive grains: Artificial diamond (particle size: 0.5 μm; "DIATEC WAMO.5" manufactured by Fujimi Incorporated; concentration in polishing liquid: 0.3% by weight);

Polishing aids: Aluminum nitrate (Concentration in polishing liquid: 1% by weight);

Applied pressure: 150 gf/cm$^2$;

Polishing time: 10 minutes;

Stock removal: 6 μm;

Carriers: Epoxy glass material;

Pad: Hard pad ("C14A" manufactured by Rodel nitta);

Rotational speed of lap plate: 30 r.p.m.; and

Flow rate of polishing liquid: 40 cc/min.

On this mirror-polished substrate 31, a Ti layer 32 having a thickness of 100 nm was formed by a DC magnetron sputtering method while keeping the conditions of an argon gas pressure of 3 mTorr and a substrate temperature of 180° C. Next, an Al—Si alloy layer 33 having a thickness of 30 nm was formed on the Ti layer 32 by a DC magnetron sputtering method to give rugged surfaces, under the conditions of an argon gas pressure of 3 mTorr and a substrate temperature of 180° C. Thereafter, a carbon layer 34 having a thickness of 20 nm, a Cr layer 35 having a thickness of 40 nm, and a Co—Cr—Pt—B magnetic alloy layer 36 having a thickness of 40 nm were sequentially formed on the Al—Si alloy layer 33 by a DC magnetron sputtering method. Incidentally, when the layers 32 to 36 were formed, a bias voltage of −200 V was applied to the substrate except for the layers 33 and 34. Further, on the Co—Cr—Pt—B magnetic alloy layer 36, a protective layer (glassy carbon layer) 37 having a thickness of 15 run was formed by DC magnetron sputtering. Subsequently, the resulting substrate was impregnated with a solution of "FOMBLIN Z03" (manufactured by Aujimont) to apply a coating thereon, so that a lubricant layer 38 having a thickness of 15 nm was formed, to give a magnetic recording medium as shown in FIG. 7.

Example 10

Both sides of the carbon substrate obtained in Production Example 4 were subjected to grinding by ductile mode grinding under similar conditions to those of Example 9 except for the following.

Kinds of abrasive grains:

"#2000 DIAMOND" (average grain size: about 6 μm; an iron-based bond grinding wheel: "SD2000N100FX3" manufactured by Shintobrator); and "#20000 DIAMOND" (average grain size: about 1.2 μm; an iron-based bond grinding wheel: "SD20000N100FX3" manufactured by Shintobrator).

The grinding was carried out with a "#2000 DIAMOND" grinding wheel having a setting depth of cut of 10 μm for 3 runs, followed by grinding with a "#20000 DIAMOND" grinding wheel having a setting depth of cut of 3 μm for one run, and then with the "#20000 DIAMOND" grinding wheel having a setting depth of cut of 2 μm for one run. The shoulders of the grinding wheel were subjected to precision truing to trim into a shape of the generating line as shown in FIG. 5 for "#2000 DIAMOND" grinding wheel, and then to precision truing to trim into a shape of the generating line as shown in FIG. 8. Here, the individual abrasive grains were set to have depths of cut of equal to or less than the ductile-brittle transition point (about 50 nm) of the carbon substrate.

Incidentally, the resulting surface-worked substrate was observed with an optical microscope, and it was found to have grinding marks of arc patterns. The arc patterns were found to have no intersection therebetween.

Next, the resulting surface-worked substrate was subjected to a finish polishing by a conventional method using loose abrasive grains, to give a mirror-polished substrate. The primary polishing conditions were the same as those of Example 9 except for the following.

Abrasive grains: γ-Alumina (particle size: 0.03 μm; "NANOFINE A-30" manufactured by Hinomoto Kenmazai Kabushiki Kaisha; concentration in polishing liquid: 0.15% by weight);

Applied pressure: 200 gf/cm$^2$; and

Polishing time: 10 minutes.

The resulting mirror-polished substrate was used to produce a magnetic recording medium by procedures similar to those of Example 9.

Example 11

Both sides of the carbon substrate obtained in Production Example 5 were subjected to grinding by ductile mode grinding under similar conditions to those of Example 9 except for the following.

Setting depths of cut of grinding wheel: 2 μm, for three runs; and

Kinds of abrasive grains:

Using only "#12000 DIAMOND" (average grain size: about 1.2 μm) (an iron fiber bond grinding wheel: "SD12000N100FX3" manufactured by Shintobrator).

Incidentally, the resulting surface-worked substrate was observed with an optical microscope, and it was found to have grinding marks of arc patterns. The arc patterns were found to have no intersection therebetween.

Next, the resulting surface-worked substrate was subjected to a finish polishing by a conventional method using loose abrasive grains, to give a mirror-polished substrate. The primary polishing conditions were the same as Example 9 except for the following.

Abrasive grains: WA alumina (particle size: 0.3 μm; "WA30000" manufactured by Fujimi Incorporated; concentration in polishing liquid: 3% by weight);

Polishing aids: Aluminum nitrate (Concentration in polishing liquid: 1% by weight);

Applied pressure: 200 gf/cm$^2$;

Rotational speed of lower plate: 25 r.p.m.; and

Flow rate of polishing liquid: 30 cc/min.

The resulting mirror-polished substrate was used to produce a magnetic recording medium by procedures similar to those of Example 9.

Example 12

Both sides of the carbon substrate obtained in Production Example 5 were subjected to grinding by ductile mode grinding under similar conditions to those of Example 9 except for the following.

Setting depths of cut of grinding wheel:

(1) Depth: 5 μm, for one run;

(2) Depth: 3 μm, for one run; or (3) Depth: 1 μm, for one run.

Kinds of abrasive grains:

Using only "#12000 DIAMOND" (average grain size: about 1.2 μm) (an iron-based grinding wheel: "SD12000N100FX3" manufactured by Shintobrator).

The resulting surface-worked substrate was observed with an optical microscope, and it was found to have grinding marks of arc patterns. The arc patterns were found to have no intersection therebetween.

Next, the resulting surface-worked substrate was subjected to a finish polishing by a conventional method using loose abrasive grains, to give a mirror-polished substrate. The primary polishing conditions were similar to those of Example 9 except for the following.

Abrasive grains: Cerium sulfate (particle size:

1 μm; "OPALINE" manufactured by Showa Denko Kabushiki Kaisha; concentration in polishing liquid: 1% by weight);

Polishing aids: Aluminum nitrate (Concentration in polishing liquid: 1% by weight); and Applied pressure: 200 gf/cm$^2$.

The resulting mirror-polished substrate was used to produce a magnetic recording medium by procedures similar to those of Example 9.

Example 13

A reinforced glass substrate (Ra: 10 nm) having a diameter of 1.8 inches, which was previously subjected to chamfering, was subjected to grinding by ductile mode grinding in the same manner as in Example 9 except for the following, to produce a surface-worked substrate. Incidentally, the reinforced glass substrate used herein has a ductile-brittle transition point of about 25 nm.

Setting depths of cut of grinding wheel:

Depth: 5.0 μm, for three runs; or

Depth: 1.0 μm, for one run.

Using only "#12000 DIAMOND" (average grain size: about 1.2 μm) (an iron-based grinding wheel: "SD12000N100FX3" manufactured by Shintobrator).

The resulting surface-worked substrate was observed with an optical microscope, and it was found to have grinding marks of arc patterns. The arc patterns were found to have no intersection therebetween.

Next, the resulting surface-worked substrate was subjected to a finish polishing by a conventional method using loose abrasive grains, to give a mirror-polished substrate. The primary polishing conditions were similar to those of Example 12 except for the following.

Polishing time: 20 minutes.

The resulting mirror-polished substrate was used to produce a magnetic recording medium by procedures similar to those of Example 9.

Example 14

Both sides of the carbon substrate obtained in Production Example 5 were subjected to grinding by ductile mode grinding under similar conditions to those of Example 9 except for the following.

Setting depths of cut of grinding wheel:

(1) Depth: 5 μm, for one run;

(2) Depth: 1 μm, for one run; or (3) Depth: 0.1 μm, for two runs.

Kinds of abrasive grains:

"#3000 DIAMOND" (average grain size: about 5 μm, a resin bond grinding wheel: "SD3000L100B" manufactured by Tokyo Diamond Kougu Seishakusho);

Coolant: Water; and

Initial Truing: First truing with "#200 DIAMOND" (average grain size: about 75 μm, "SD200Q75M" manufactured by Kabushiki Kaisha Oriental Diamond Tools Research and Development Laboratory), and then directly used for grinding (No ELID used)).

The resulting surface-worked substrate was observed with an optical microscope, and it was found to have grinding marks of arc patterns. The arc patterns were found to have no intersection therebetween.

Next, the resulting surface-worked substrate was subjected to a finish polishing by a conventional method using loose abrasive grains, to give a mirror-polished substrate. The primary polishing conditions were similar to those of Example 9 except for the following.

Abrasive grains: Silica sol (particle size: 0.03 μm; "GLANZOL 3250" manufactured by Fujimi Incorporated; concentration in polishing liquid: 0.5% by weight);

Applied pressure: 200 gf /cm$^2$;

Polishing time: 20 minutes; and

Rotational speed of lower plate: 15 r.p.m.

The resulting mirror-polished substrate was used to produce a magnetic recording medium by procedures similar to those of Example 9.

Example 15

A silicon wafer for semiconductors (Ra: 0.1 μm) which was previously subjected to chamfering to a diameter of 1.8 inches, was subjected to grinding by ductile mode grinding in the same manner as in Example 9 except for the following, to produce a surface-worked substrate. Incidentally, the silicon wafer for semiconductors used herein has a ductile-brittle transition point of about 80 nm.

Setting depths of cut of grinding wheel:

(1) Depth: 3 μm, for one run;

(2) Depth: 2 μm, for one run; or (3) Depth: 0.1 μm, for two runs.

Kinds of abrasive grains:

Using only "#12000 DIAMOND" (average grain size: about 1.2 μm, an iron-base bond grinding wheel: "SD12000N100FX3" manufactured by Shintobrator).

The resulting surface-worked substrate was observed with an optical microscope, and it was found to have grinding marks of arc patterns. The arc patterns were found to have no intersection therebetween.

Next, the resulting surface-worked substrate was subjected to a finish polishing by a conventional method using loose abrasive grains, to give a mirror-polished substrate. The primary polishing conditions were the same as Example 14.

The resulting mirror-polished substrate was used to produce a magnetic recording medium by procedures similar to those of Example 9.

Comparative Example 7

The carbon substrate obtained in Production Example 5 was subjected to finish grinding by ductile mode grinding in the same manner as in Example 9 except for the following, to produce a surface-worked substrate.

Setting depths of cut of grinding wheel:
Depth: 40 $\mu$m, for two runs.
Kinds of abrasive grains:
"#6000 DIAMOND" (average grain size: about 2.5 $\mu$m) (an iron-based bond grinding wheel: "SD6000NFA" manufactured by Shintobrator).

The resulting surface-worked substrate was observed with an optical microscope, and it was found to have grinding marks of arc patterns. The arc patterns were found to have no intersection therebetween.

Next, the resulting surface-worked substrate was subjected to a finish polishing by a conventional method using loose abrasive grains, to give a mirror-polished substrate. The primary polishing conditions were the same as Example 9.

The resulting mirror-polished substrate was used to produce a magnetic recording medium by procedures similar to those of Example 9.

Comparative Example 8

The carbon substrate obtained in Production Example 5 was subjected to finish grinding on both sides of the substrate with a cup-shaped grinding wheel by using a vertical, plane grinding machine ("VPG," manufactured by Kabushiki Kaisha Nisshin Kikai Seisakusho) to produce a surface-worked substrate.

Primary Grinding Conditions
Diameter of rotary work table: 400 mm;
Rotational speed of rotary work table: 350 r.p.m.;
Peripheral speed of grinding wheel: 1200 m/min;
Kinds of abrasive grains:
"#3000 DIAMOND" (average grain size: about 5 $\mu$m, a resin bond grinding wheel: "SD3000L100B" manufactured by Tokyo Diamond Kougu Seishakusho;
Coolant: Water;
Initial Truing: "#200 DIAMOND" (average grain size: about 75 $\mu$m, "SD200Q75M" manufactured by Kabushiki Kaisha Oriental Diamond Tools Research and Development Laboratory); and
Setting depth of cut of grinding wheel: 1.0 $\mu$m.

Under the conditions described above, a stock removal of 10 $\mu$m was ground off without using ELID.

The resulting surface-worked substrate was observed with an optical microscope, and it was found to have grinding marks with multiple, crisscross patterns. Also, it was found to have innumerable intersections of the grinding marks.

Next, the resulting surface-worked substrate was subjected to a finish polishing by a conventional method using loose abrasive grains, to give a mirror-polished substrate. The primary polishing conditions were the same as Example 10.

The resulting mirror-polished substrate was used to produce a magnetic recording medium by procedures similar to those of Example 9.

Comparative Example 9

The carbon substrate obtained in Production Example 5 was subjected to grinding in the same manner as in Comparative Example 8 to thereby grind off 30 $\mu$m.

The resulting surface-worked substrate was observed with an optical microscope, and it was found to have grinding marks with multiple, crisscross patterns. Also, it was found to have innumerable intersections of the grinding marks.

Next, the resulting surface-worked substrate was subjected to a finish polishing. The primary polishing conditions were similar to those of Example 14 except for the following.

Polishing time: 10 minutes.

The resulting mirror-polished substrate was used to produce a magnetic recording medium by procedures similar to those of Example 9.

Each of the surfaces of the surface-worked substrates used in Examples 9 to 15 and Comparative Examples 7 to 9 was observed with an optical microscope and SEM (scanning electron microscope) to confirm whether the grinding proceeded in a ductile mode or a brittle mode. Those with smooth grinding marks were obtained by a ductile mode grinding, whereas those giving rough surfaces without smoothness and containing microcracks remaining therein were obtained by a brittle mode grinding.

In addition, Ra of the surface-worked substrate (Ra*[1]) was measured. Further, each of the resulting mirror-polished substrate was evaluated with respect to Ra*[2] and flatness. The flatness was measured by using "MARK 4" manufactured by ZYGO. In cases of the surface-worked substrates with working marks, including ones with the grinding marks in arc patterns and ones with the grinding marks in multiple, crisscross patterns except for those with random scratches, the Ra*[1] and Rp were obtained by scanning with a stylus-type profilometer in a direction perpendicular to the grinding marks, namely in a direction of the maximum profile peak height. Also, the Ra*[2] was obtained by scanning with a stylus-type profilometer in a direction of the diameter of the mirror-polished substrate.

Each of the magnetic recording media obtained in Examples 9 to 15 and Comparative Examples 7 to 9 was evaluated with respect to appearance examination and various media properties, such as glide height test (simply referred to as "GHT") properties, error properties as indices of the level of read-write error, contact start-stop (simply referred to as "CSS") properties, and corrosion resistance.

The appearance examination was conducted under bright lighting with naked eyes to check whether or not any scratches on the magnetic recording medium were found. Here, the proportion of the accepted number of media of the entire media was expressed in percentage. Here, the evaluation was made by following criteria:

⊚: Percentage of accepted product being 100%.

○: Percentage of accepted product being 50% or more and less than 100%.

Δ: Percentage of accepted product being less than 50%.

The GHT properties were tested by "MG150T" manufactured by PROQUIP using a 50% slider head. Here, the evaluation was made by the following criteria.

S: Magnetic heads with a float height of 1.5 microinches have a passing ratio of 90% or more;

A: Magnetic heads with a float height of 1.5 microinches have a passing ratio of 50% or more and less than 90%; and B: Magnetic heads with a float height of 1.5 microinches have a passing ratio of less than 50%.

The error properties were tested for 25 magnetic recording media which were found to be scratch-free by the appearance examination. When the number of errors per medium disc was 15 or less, the disc was evaluated as "accepted product," and the proportion of the accepted product in 100 media was expressed in percentage. Here, the number of errors was measured under the following conditions. As for a magnetic head, a thin-film head manufactured by Yamaha Corporation was used. Here, the entire surface was examined under the conditions of a gap width of 0.4 μm, a track width of 5 μm, a number of windings of 20 turns, a rotational speed of 6000 r.p.m., and a recording density of 51 kFCI. The number of missing errors of less than 16 bits were counted, and the evaluation was made by the following criteria:

S: 50% or more of the evaluated discs contain 0 to 5 errors per disc;

A: 50% or more of the evaluated discs contain 6 to 15 errors per disc;

B: 50% or more of the evaluated discs contain 16 to 45 errors per disc; and

C: 50% or more of the evaluated discs contain 46 or more errors per disc.

The CSS properties were evaluated by the frictional coefficient after repeating the CSS test for 20,000 times under the following conditions. As for a magnetic head, a thin-film head manufactured by Yamaha Corporation was used. The head load was 3.5 g, the floating height of the head was 2.8 microinches, the rotational speed was 4500 r.p.m., and one cycle consists of 5 seconds start and 5 seconds stop.

The corrosion resistance was evaluated by carrying out the above error properties evaluation after each of the magnetic recording medium was kept standing for 10 days under environmental conditions of a temperature of 80° C. and a humidity of 90%. Here, the evaluation was made by the following criteria:

⊚: Increased percentage of a number of errors being less than 10%.

○: Increased percentage of a number of errors being from 10% to 30%.

The results are collectively shown in Tables 3 and 4.

TABLE 3

| | | Substrate Properties | | | Media Properties | | | | |
| --- | --- | --- | --- | --- | --- | --- | --- | --- | --- |
| | Material | $Ra^{*1}$ | $Ra^{*2}$ | Flatness | Appearance Examination | GHT | Error | CSS | Corrosion Resistance |
| Example No. | | | | | | | | | |
| 9 | Carbon | 80 | 9.0 | 2.2 | ⊚ | S | S | 0.33 | ⊚ |
| 10 | Carbon | 26 | 5.1 | 2.5 | ⊚ | S | S | 0.35 | ⊚ |
| 11 | Carbon | 33 | 9.5 | 1.8 | ⊚ | S | S | 0.38 | ⊚ |
| 12 | Carbon | 30 | 8.2 | 1.6 | ⊚ | S | S | 0.33 | ⊚ |
| 13 | Reinforced Glass | 37 | 11.0 | 6.3 | ⊚ | S | A | 0.53 | ⊚ |
| 14 | Carbon | 35 | 5.0 | 2.5 | ⊚ | S | S | 0.37 | ⊚ |
| 15 | Silicon | 60 | 12.5 | 4.1 | ⊚ | S | A | 0.56 | ⊚ |

Notes: $*^1$ denote values for surface-worked substrates, and $*^2$ denote values for mirror-polished substrates.
Ra are expressed in Å, and the flatness is expressed in μm.

TABLE 4

| | | Substrate Properties | | | Media Properties | | | | |
| --- | --- | --- | --- | --- | --- | --- | --- | --- | --- |
| | Material | $Ra^{*1}$ | $Ra^{*2}$ | Flatness | Appearance Examination | GHT | Error | CSS | Corrosion Resistance |
| Comparative Example No. | | | | | | | | | |
| 7 | Carbon | 165 | 14.7 | 10.5 | ○ | A | B | 0.55 | ○ |
| 8 | Carbon | 55 | 55 | 7.5 | A | S | C | 0.42 | ○ |
| 9 | Carbon | 43 | 43 | 6.0 | A | S | C | 0.37 | ○ |

Notes: $*^1$ denotes values for surface-worked substrates, and $*^2$ denotes values for mirror-polished substrates.
Ra is expressed in units of Å, and the flatness is expressed in units of μm.

The optical microscopic/SEM observations for the surface-worked substrates used in Examples 9 to 15 showed that the worked surfaces were smooth without containing any microcracks and had remarkably smooth grinding marks, indicating that the grinding were carried out in a ductile mode. In addition, each of the mirror-polished substrates used in Examples 9 to 15 had excellent Ra values after polishing with small flatness, thereby having highly preferred performance as substrates.

Further, the magnetic recording media obtained by the method of the present invention were all excellent in the results of appearance examination, GHT properties, error properties, CSS properties, and corrosion resistance (Examples 9 to 15). Therefore, the present invention can provide a method of producing excellent magnetic recording media. Moreover, the finish polishing process can be carried out in a short period of time in the present invention, thereby making it possible to improve its efficiency.

In the step (a), in the case where a setting depth of cut of grinding wheel is large (Comparative Example 7) or cases where the grinding marks are in crisscross patterns (Comparative Examples 8 and 9), the evaluation of the error properties was notably poor. This is because the work damaged layer was not able to be completely removed by a light finish polishing of the level of these Comparative Examples.

The present invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for producing a magnetic recording medium, comprising the steps of:
    (a) subjecting surfaces of a substrate to grinding by a ductile-mode grinding with a grinding wheel using a depth of cut of greater than 0.06 $\mu$m to 20 $\mu$m, to give a surface-worked substrate having grinding marks of arc patterns; and
    (b) forming recording medium-constituting layers at least comprising an under layer, a magnetic layer, and a protective layer on said surface-worked substrate, or on a mirror-polished substrate obtained by further subjecting said surface-worked substrate to a finish polishing.

2. The method according to claim 1, wherein a material for said substrate is carbon.

3. The method according to claim 1, wherein the ductile-mode grinding is carried out by using electrolytic in-process dressing.

4. The method according to claim 1, wherein grinding in step (a) is carried out using a grinding machine having a loop rigidity of 150 N/$\mu$m or more.

5. The method according to claim 1, wherein said mirror-polished substrate has an Ra of from 1 to 20 Å, wherein said Ra is an arithmetical mean deviation of a profile taken perpendicular to the grinding marks of the arc patterns.

6. The method according to claim 1, wherein said mirror-polished substrate has a flatness of 10 $\mu$m or less.

7. The method of claim 1, wherein the depth of cut is from 0.1 to 10 $\mu$m.

8. A method for producing a magnetic recording medium, comprising the steps of:
    (a) subjecting surfaces of a substrate to grinding by a ductile-mode grinding with a grinding wheel to give a surface-worked substrate having grinding marks of arc patterns, said grinding marks of arc patterns being portions of concentric circles having a center that is offset from a center of said surface-worked substrate; and
    (b) forming recording medium-constituting layers at least comprising an under layer, a magnetic layer, and a protective layer on said surface-worked substrate.

9. The method of claim 8, wherein grinding of said surfaces of said substrate is performed using a depth of cut of from 0.05 to 20 $\mu$m.

10. A method for producing a magnetic recording medium, comprising the steps of:
    (a) subjecting surfaces of a substrate to grinding by a ductile-mode grinding with a grinding wheel to give a surface-worked substrate having grinding marks of arc patterns, said grinding marks of arc patterns being portions of concentric circles having a center that is offset from a center of said surface-worked substrate;
    (b) subjecting said surface-worked substrate to a finish polishing to give a mirror-polished substrate; and
    (c) forming recording medium-constituting layers at least comprising an under layer, a magnetic layer, and a protective layer on said mirror-polished substrate.

11. The method of claim 10, wherein grinding of said surfaces of said substrate is performed using a depth of cut of from 0.05 to 20 $\mu$m.

* * * * *